(12) United States Patent (10) Patent No.: US 12,574,216 B2

Peddada (45) Date of Patent: \*Mar. 10, 2026

(54) MULTI-TENANT HARDWARE-BACKED TRANSPORT LAYER SECURITY KEY MANAGEMENT

(71) Applicant: Salesforce, Inc., San Francisco, CA (US)

(72) Inventor: Prasad Peddada, Alameda, CA (US)

(73) Assignee: Salesforce, Inc., San Francisco, CA (US)

( \* ) Notice: Subject to any disclaimer, the term of this patent is extended or adjusted under 35 U.S.C. 154(b) by 88 days.

This patent is subject to a terminal disclaimer.

(21) Appl. No.: 18/426,150

(22) Filed: Jan. 29, 2024

(65) Prior Publication Data

US 2024/0422196 A1 Dec. 19, 2024

Related U.S. Application Data

(60) Provisional application No. 63/523,913, filed on Jun. 28, 2023, provisional application No. 63/508,805, filed on Jun. 16, 2023.

(51) Int. Cl.
H04L 9/08 (2006.01)
H04L 9/14 (2006.01)
(Continued)

(52) U.S. Cl.
CPC .......... H04L 9/0825 (2013.01); H04L 9/0866 (2013.01); H04L 9/14 (2013.01); H04L 9/3268 (2013.01); H04L 63/166 (2013.01)

(58) Field of Classification Search
CPC ....... H04L 9/0825; H04L 9/0866; H04L 9/14; H04L 9/3268; H04L 63/166; H04L 9/3247; H04L 63/0823
See application file for complete search history.

(56) References Cited

U.S. PATENT DOCUMENTS

| | | | |
|---|---|---|---|
| 10,230,529 B2 * | 3/2019 | Costa ...................... | G06F 21/62 |
| 11,258,617 B1 * | 2/2022 | Peddada ............... | H04L 9/0838 |

(Continued)

FOREIGN PATENT DOCUMENTS

| | | | | |
|---|---|---|---|---|
| AU | 2014342646 A1 * | 5/2016 | ......... | H04L 63/0442 |
| CN | 109672522 B * | 7/2021 | ............ | H04L 67/10 |
| KR | 20210151016 A * | 12/2021 | .......... | H04L 9/3247 |

*Primary Examiner* — John B King

(74) *Attorney, Agent, or Firm* — Holland & Hart, LLP

(57) ABSTRACT

A method of data processing is described. The method includes receiving, at a server host, a request to access a web domain associated with a tenant of a multi-tenant cloud platform; retrieving, from a database, a tenant private key and a certificate associated with the tenant, where the tenant private key is encrypted with a secret key derived from a key agreement public key associated with the tenant and a private key provisioned to a key protection component of the server host; providing, to the key protection component, the encrypted tenant private key and the key agreement public key; receiving, from the key protection component, an API response including a signature associated with the tenant private key; and providing, to a client device associated with the request to access the web domain of the tenant, the certificate and the signature, where the certificate is used to verify the signature.

20 Claims, 11 Drawing Sheets

(51) Int. Cl.
    *H04L 9/32*           (2006.01)
    *H04L 9/40*           (2022.01)

(56) References Cited

U.S. PATENT DOCUMENTS

| | | | |
|---|---|---|---|
| 11,522,686 B2* | 12/2022 | Peddada | H04L 9/3066 |
| 11,626,985 B1 | 4/2023 | Copparapu et al. | |
| 12,362,917 B2* | 7/2025 | Sabbu | G06Q 20/38215 |
| 2003/0005317 A1* | 1/2003 | Audebert | H04L 63/20 |
| | | | 713/193 |
| 2012/0096271 A1* | 4/2012 | Ramarathinam | H04L 63/168 |
| | | | 709/227 |
| 2015/0318986 A1* | 11/2015 | Novak | H04L 9/0894 |
| | | | 713/189 |
| 2015/0379259 A1* | 12/2015 | Mohammed | H04L 63/08 |
| | | | 726/6 |
| 2018/0287786 A1 | 10/2018 | Calahan | |
| 2019/0052456 A1* | 2/2019 | Bygrave | G06F 21/6209 |
| 2019/0132299 A1 | 5/2019 | Tucker et al. | |
| 2019/0229908 A1* | 7/2019 | Peddada | G06F 21/602 |
| 2021/0143991 A1* | 5/2021 | Toal | H04L 9/0861 |
| 2021/0226777 A1 | 7/2021 | Wilson | |
| 2021/0359842 A1 | 11/2021 | Pillai et al. | |
| 2022/0014358 A1 | 1/2022 | Retaureau et al. | |
| 2022/0014524 A1 | 1/2022 | Brown et al. | |
| 2022/0182374 A1 | 6/2022 | Peddada et al. | |
| 2022/0247554 A1* | 8/2022 | Peddada | H04L 9/0897 |
| 2022/0329442 A1 | 10/2022 | Bulusu et al. | |
| 2023/0188362 A1 | 6/2023 | Niu et al. | |
| 2023/0342277 A1* | 10/2023 | Rosati | H04L 9/3247 |
| 2024/0073032 A1* | 2/2024 | Sterbling | G06F 21/606 |
| 2024/0323034 A1* | 9/2024 | Kumar | H04L 9/3268 |
| 2024/0421982 A1 | 12/2024 | Peddada | |
| 2024/0422000 A1* | 12/2024 | Peddada | H04L 9/3226 |
| 2024/0422150 A1* | 12/2024 | Peddada | H04L 9/0863 |

* cited by examiner

Provisioning

200

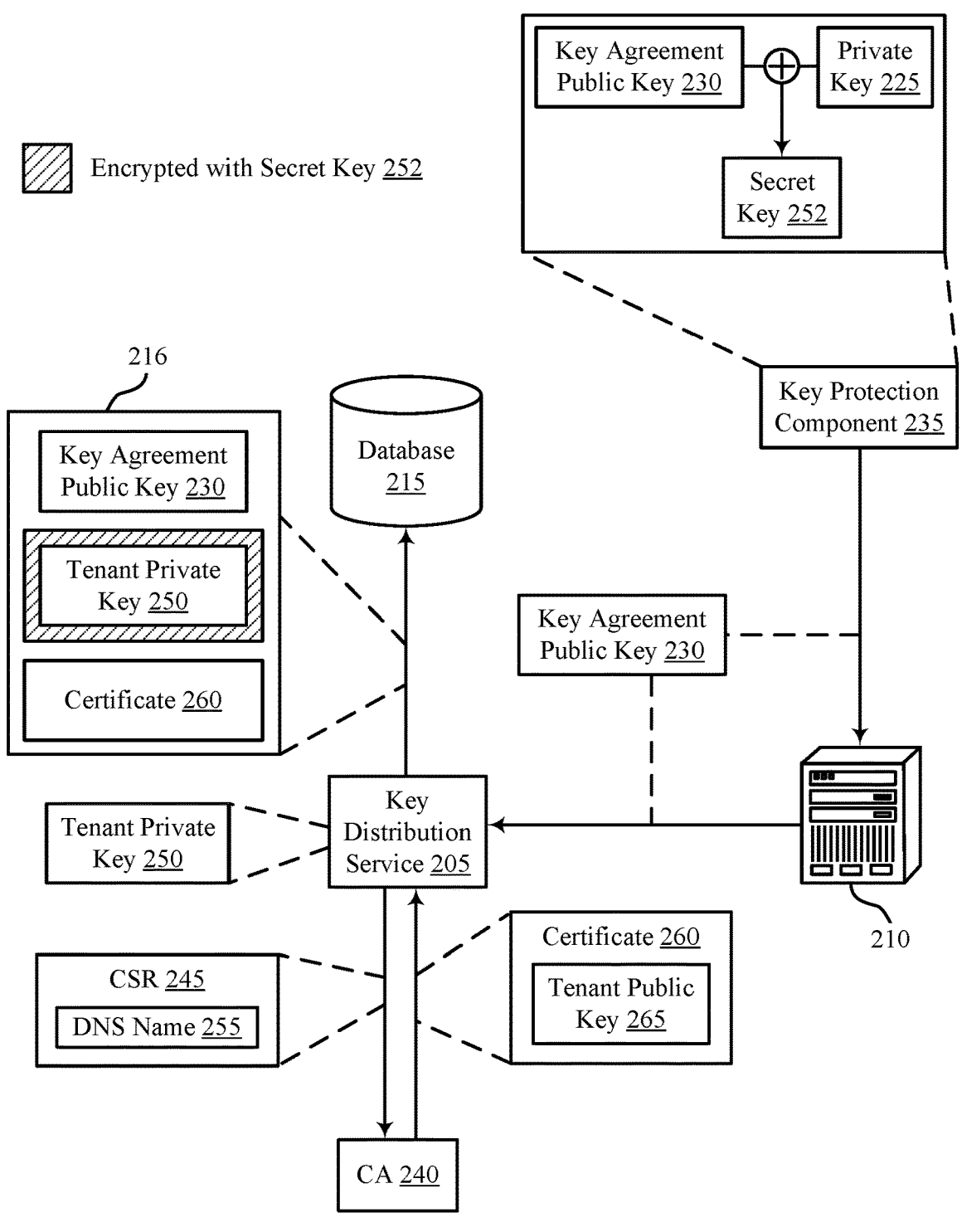
Sign-Up                    FIG. 2B                    ⤹ 201

Sign-Up

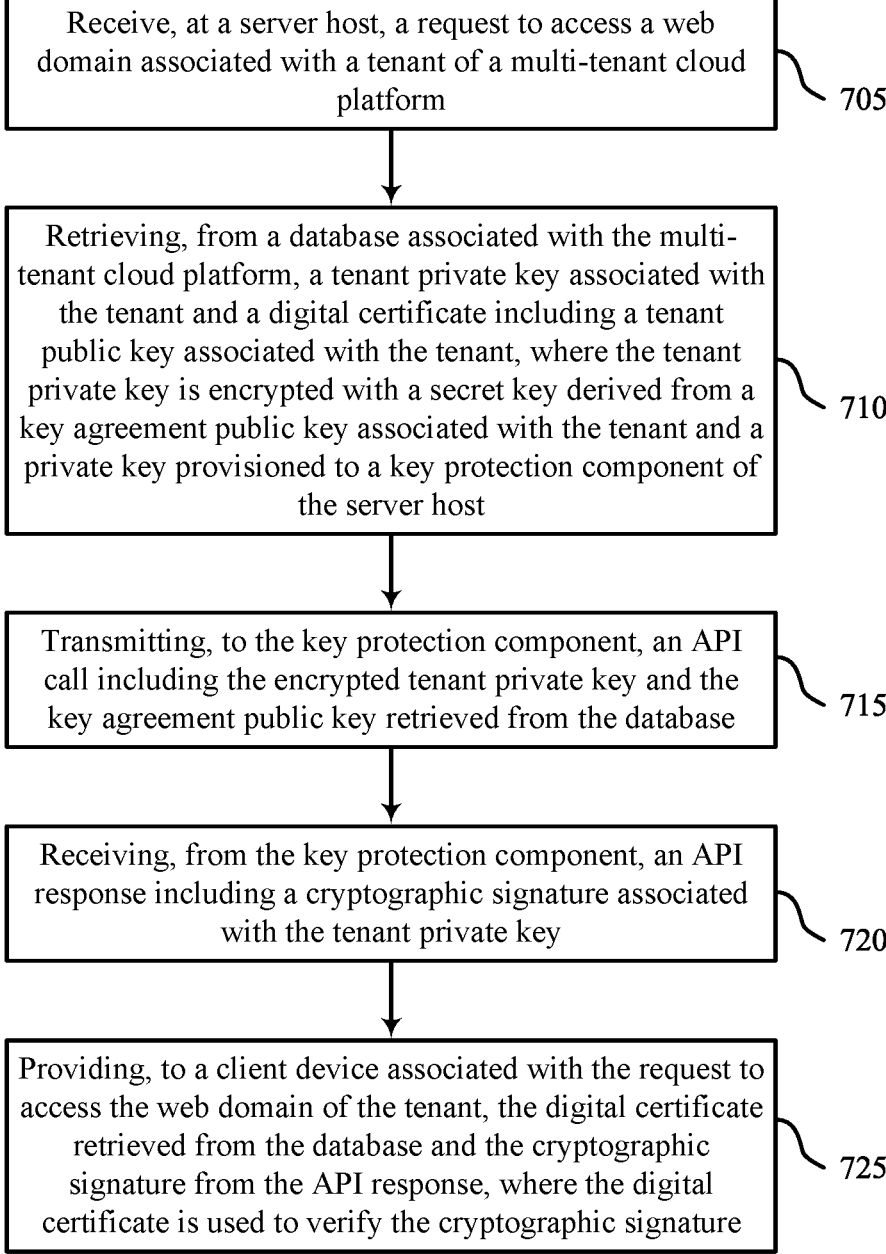

Receive, at a server host, a request to access a web domain associated with a tenant of a multi-tenant cloud platform ⟍ 705

Retrieving, from a database associated with the multi-tenant cloud platform, a tenant private key associated with the tenant and a digital certificate including a tenant public key associated with the tenant, where the tenant private key is encrypted with a secret key derived from a key agreement public key associated with the tenant and a private key provisioned to a key protection component of the server host ⟍ 710

Transmitting, to the key protection component, an API call including the encrypted tenant private key and the key agreement public key retrieved from the database ⟍ 715

Receiving, from the key protection component, an API response including a cryptographic signature associated with the tenant private key ⟍ 720

Providing, to a client device associated with the request to access the web domain of the tenant, the digital certificate retrieved from the database and the cryptographic signature from the API response, where the digital certificate is used to verify the cryptographic signature ⟍ 725

MULTI-TENANT HARDWARE-BACKED TRANSPORT LAYER SECURITY KEY MANAGEMENT

CROSS REFERENCES

The present Application for Patent claims the benefit of U.S. Patent Application No. 63/508,805 by Peddada, entitled "MULTI-TENANT HARDWARE-BACKED TRANS-PORT LAYER SECURITY KEY MANAGEMENT," filed Jun. 16, 2023, and U.S. Patent Application No. 63/523,913 by Peddada, entitled "MULTI-TENANT HARDWARE-BACKED TRANSPORT LAYER SECURITY KEY MAN-AGEMENT," filed Jun. 28, 2023, each of which are assigned to the assignee hereof and expressly incorporated by reference herein.

FIELD OF TECHNOLOGY

The present disclosure relates generally to database systems and data processing, and more specifically to multi-tenant hardware-backed transport layer security key management.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A cloud-based system may use transport layer security (TLS) to secure communications between a server host and a user device. In some cases, however, TLS encryption may terminate before the communications reach the destination (i.e., the server host), which can result in data being exposed, intercepted, tampered with, etc.

BRIEF DESCRIPTION OF THE DRAWINGS

FIGS. 2A, 2B, and 2C show examples of computing systems that supports multi-tenant hardware-backed transport layer security key management in accordance with aspects of the present disclosure.

FIG. 7 shows a flowchart illustrating methods that support multi-tenant hardware-backed transport layer security key management in accordance with aspects of the present disclosure.

DETAILED DESCRIPTION

Figure 1:
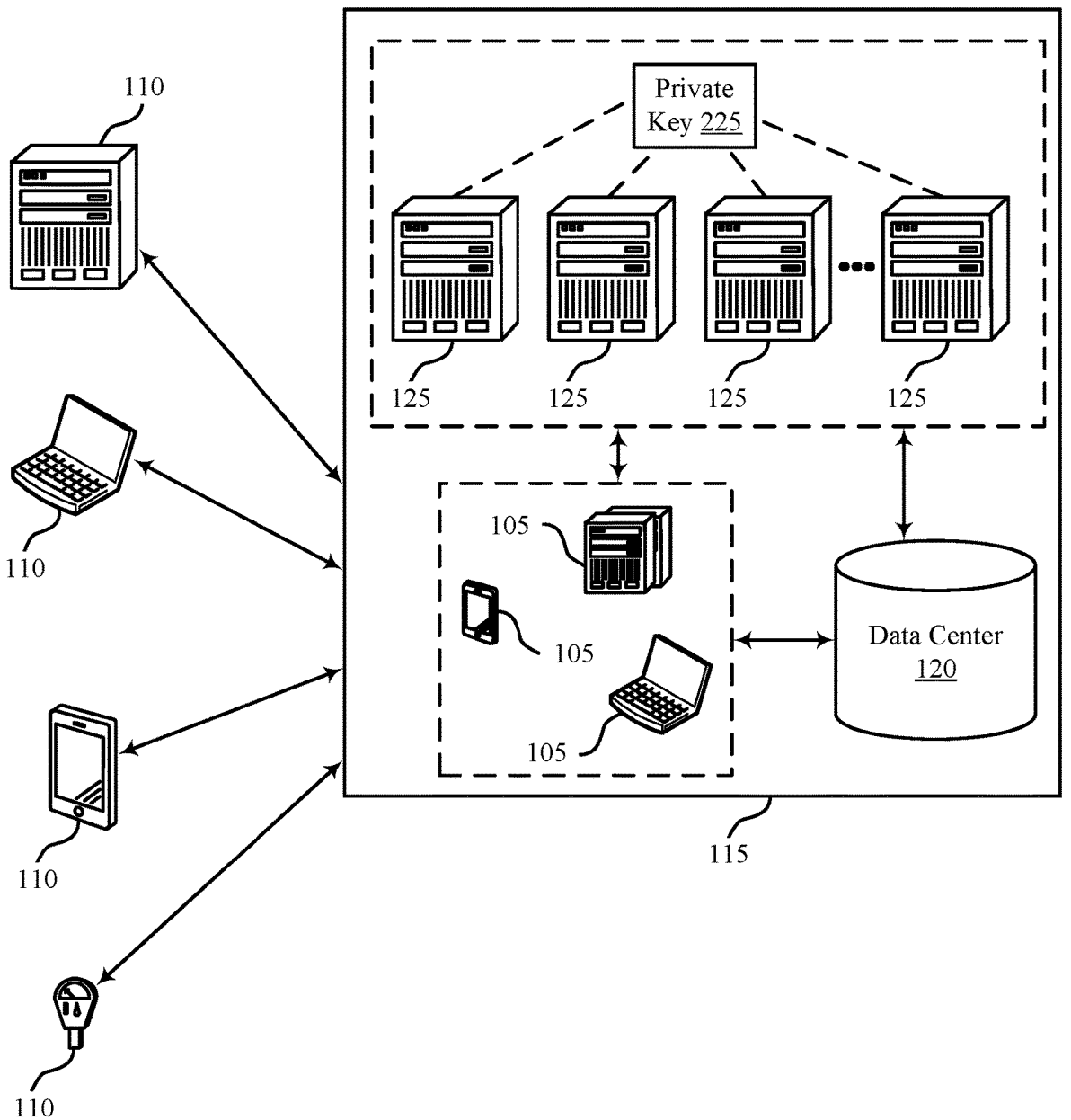
FIG. 1 illustrates an example of a computing system that supports multi-tenant hardware-backed transport layer security key management in accordance with aspects of the present disclosure.

Transport layer security (TLS) is a widely used cryptographic protocol that provides secure communication over a network by establishing an encrypted and authenticated connection between a client (such as a web browser) and a server (also referred to herein as a server host or an application server). TLS works through a series of steps that are collectively known as a TLS handshake. In a TLS handshake, the server sends its certificate to the client, which includes a public key of the server. Accordingly, the client may use the public key to verify the authenticity of the server's certificate, and to ensure that the certificate is valid and issued by a trusted Certificate Authority (CA). Once verified, the client and server can establish a shared secret key that can be used for symmetric encryption of data thereafter.

In some cases, however, TLS encryption may terminate before the data reaches the server. For example, in some networks, communications may be encrypted until they reach a load balancer (i.e., a network entity that distributes incoming network traffic across a group of servers according to traffic levels and resource availability), at which point they may flow in clear (i.e., unencrypted) from the load balancer to the server. Passing unencrypted data from the load balancer to the server (and vice versa) can result in data being exposed, intercepted, tampered with, etc.

Aspects of the present disclosure generally provide for using hardware-backed encryption techniques to improve the security, efficiency, and scalability of conventional TLS schemes. In accordance with the techniques described herein, a server host may receive a request to access a web domain associated with a tenant of a multi-tenant cloud platform. The server host may retrieve, from a database associated with the multi-tenant cloud platform, a tenant private key associated with the tenant and a digital certificate (referred to hereinafter as a certificate) that includes a tenant public key associated with the tenant. The tenant private key may be encrypted with a secret key that is derived from a key agreement public key and a private key provisioned to a key protection component of the server host. The server host may pass the encrypted tenant private key and the key agreement public key to the key protection component, which may use the key agreement public key and the private key to generate the secret key. Accordingly, the key protection component may use the secret key to decrypt the tenant private key, generate a cryptographic signature (referred to hereinafter as a signature) using the decrypted tenant private key, and return the signature to the server host. The server host may provide the signature and the certificate to a client device (referred to hereinafter as a client) that requested access to the web domain. The client can use the certificate to verify the authenticity of the signature.

As used herein, the terms "wrapping" and "wrapped" refer to the cryptographic process of using symmetric encryption algorithms known as key wrap constructions to encapsulate (i.e., wrap) cryptographic key material. Although some implementations of the subject matter described in this disclosure can be accomplished using key wrapping techniques, it is to be understood that other approaches (such as key agreement approaches) can also be used to accomplish substantially the same result. For example, in accordance with a key agreement approach, two parties or systems may be associated with respective elliptic-curve key pair, and the two parties or systems may derive a shared secret using an anonymous key agreement scheme, such as an Elliptic Curve Diffie-Hellman (ECDH) Key Exchange scheme. The shared secret may be used as or as the basis of a key, such as the secret key described herein.

Aspects of the present disclosure may be implemented to realize one or more of the following advantages. In some implementations, using a hardware-based encryption scheme to store and manage tenant private keys within a multi-tenant cloud system may reduce the likelihood of data being compromised, stolen, intercepted, etc. In particular, the described techniques may improve the overall security of the multi-tenant cloud system by terminating TLS encryption at the destination (i.e., the server host), thereby ensuring that data does not flow in clear (e.g., unencrypted) at any point between the client and the server host. The described techniques may also promote greater security and isolation between tenants of the multi-tenant cloud system, as each tenant may be provisioned with their own tenant-specific, hardware-backed private key.

Aspects of the disclosure are initially described in the context of data processing systems, computing systems, and process flows. Aspects of the disclosure are further illustrated by and described with reference to apparatus diagrams, system diagrams, and flowcharts that relate to multi-tenant hardware-backed TLS key management.

FIG. 1 illustrates an example of a computing system 100 that supports multi-tenant hardware-backed transport layer security key management in accordance with various aspects of the present disclosure. The computing system 100 includes cloud clients 105, contacts 110, cloud platform 115, and data center 120. Cloud platform 115 may be an example of a public or private cloud network. A cloud client 105 may access cloud platform 115 over a network connection. The network may implement transfer control protocol and internet protocol (TCP/IP), such as the Internet, or may implement other network protocols. A cloud client 105 may be an example of a user device, such as a server, a smartphone, or a laptop. In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions may include communications, opportunities, purchases, sales, or any other interaction between a cloud client 105 and a contact 110. Data may be associated with the interactions. A cloud client 105 may access cloud platform 115 to store, manage, and process the data associated with the interactions. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction. The interaction may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server, a laptop, a smartphone, or a sensor. In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions from the cloud client 105 over a network connection, and may store and analyze the data. In some cases, cloud platform 115 may receive data directly from an interaction between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via a network connection, or directly from the cloud client 105 or an interaction between a contact 110 and the cloud client 105. Data center 120 may utilize multiple redundancies for security purposes. In some cases, the data stored at data center 120 may be backed up by copies of the data at a different data center (not pictured).

A subsystem (e.g., pod) may include cloud clients 105, cloud platform 115, and data center 120. In some cases, data processing may occur at any of the components of a subsystem, or at a combination of these components. In some cases, servers may perform the data processing. The servers may be a cloud client 105 or located at data center 120.

The computing system 100 may be an example of a multi-tenant system. For example, the computing system 100 may store data and provide applications, solutions, or any other functionality for multiple tenants concurrently. A tenant may be an example of a group of users (e.g., an organization) associated with a same tenant identifier (ID) who share access, privileges, or both for the computing system 100. The computing system 100 may effectively separate data and processes for a first tenant from data and processes for other tenants using a system architecture, logic, or both that support secure multi-tenancy. In some examples, the computing system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the computing system 100 may run a single instance of software on a processing device (e.g., a server, server cluster, virtual machine) to serve multiple tenants. Such a multi-tenant system may provide for efficient integrations (e.g., using APIs) by applying the integrations to the same software application and underlying architectures supporting multiple tenants. In some cases, processing resources, memory resources, or both may be shared by multiple tenants.

As described herein, the computing system 100 may support any configuration for providing multi-tenant functionality. For example, the computing system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The computing system 100 may support scaling of tenants within the multi-tenant system, for example, using scale triggers, automatic scaling procedures, scaling requests, or any combination thereof. In some cases, the computing system 100 may implement one or more scaling rules to enable relatively fair sharing of resources across tenants. For example, a tenant may have a threshold quantity of processing resources, memory resources, or both to use, which in some cases may be tied to a subscription by the tenant.

In some data processing systems, TLS termination happens on the load balancer, and traffic flows in clear between the load balancer and the application server 125. Using the techniques described herein, TLS encryption can be terminated on the application server 125, thereby offering better protection for customers and improved security. The described techniques may also enable the application server 125 to provide each tenant with their own TLS private key backed by hardware. In accordance with one or more aspects of the present disclosure, each tenant domain may be provisioned with a unique private key and certificate protected inside hardware. Each tenant/customer may select their own CA, as opposed to using a default CA. The described techniques may support commodity hardware-backed private key protection without relying on hardware security modules (HSMs). The hardware-backed key protection mechanisms disclosed herein offer better scalability and greater efficiency, as they may not rely on custom hardware to protect private keys.

As shown in the example of FIG. 1, each of the application servers 125 associated with the multi-tenant cloud platform 115 may be provisioned with the same private key 225 for a given service. The private key 225 may be backed by its own certificate issued by a CA of the multi-tenant cloud platform 115, as opposed to relying on other vendors (although other CAs may be used within the scope of the present disclosure). Security personnel associated with the multi-tenant cloud platform 115 can setup the private key 225, and application personnel can handle certificate provisioning, thereby promoting access control and duty separation. The private key 225 may be protected (i.e., secured) within a key protection component of each application server 125, such that the private key 225 is not accessible or otherwise discoverable in the memory of the application servers 125.

It should be appreciated by a person skilled in the art that one or more aspects of the disclosure may be implemented to solve additional or alternative problems not specifically mentioned above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2A:
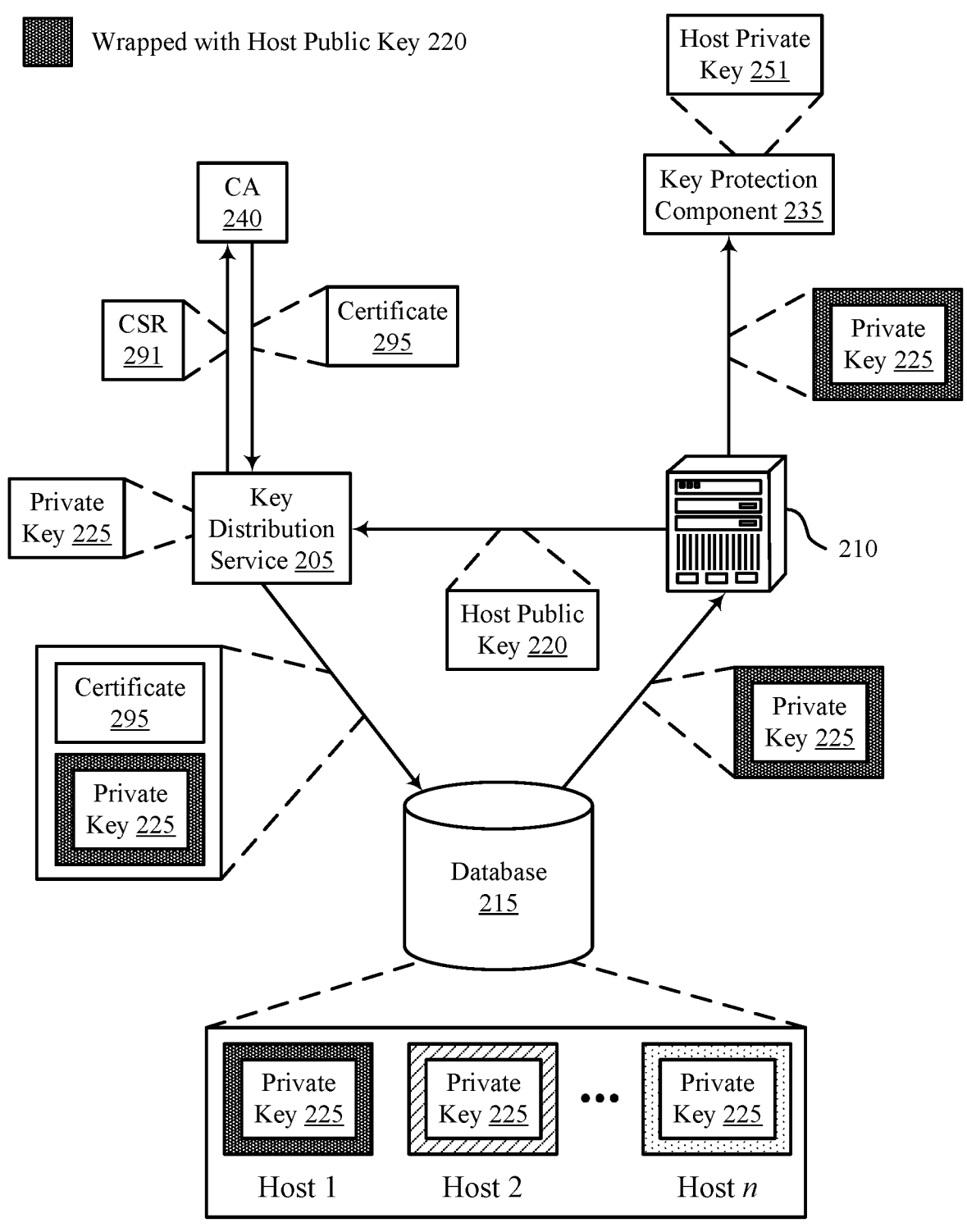
Figure 2C:
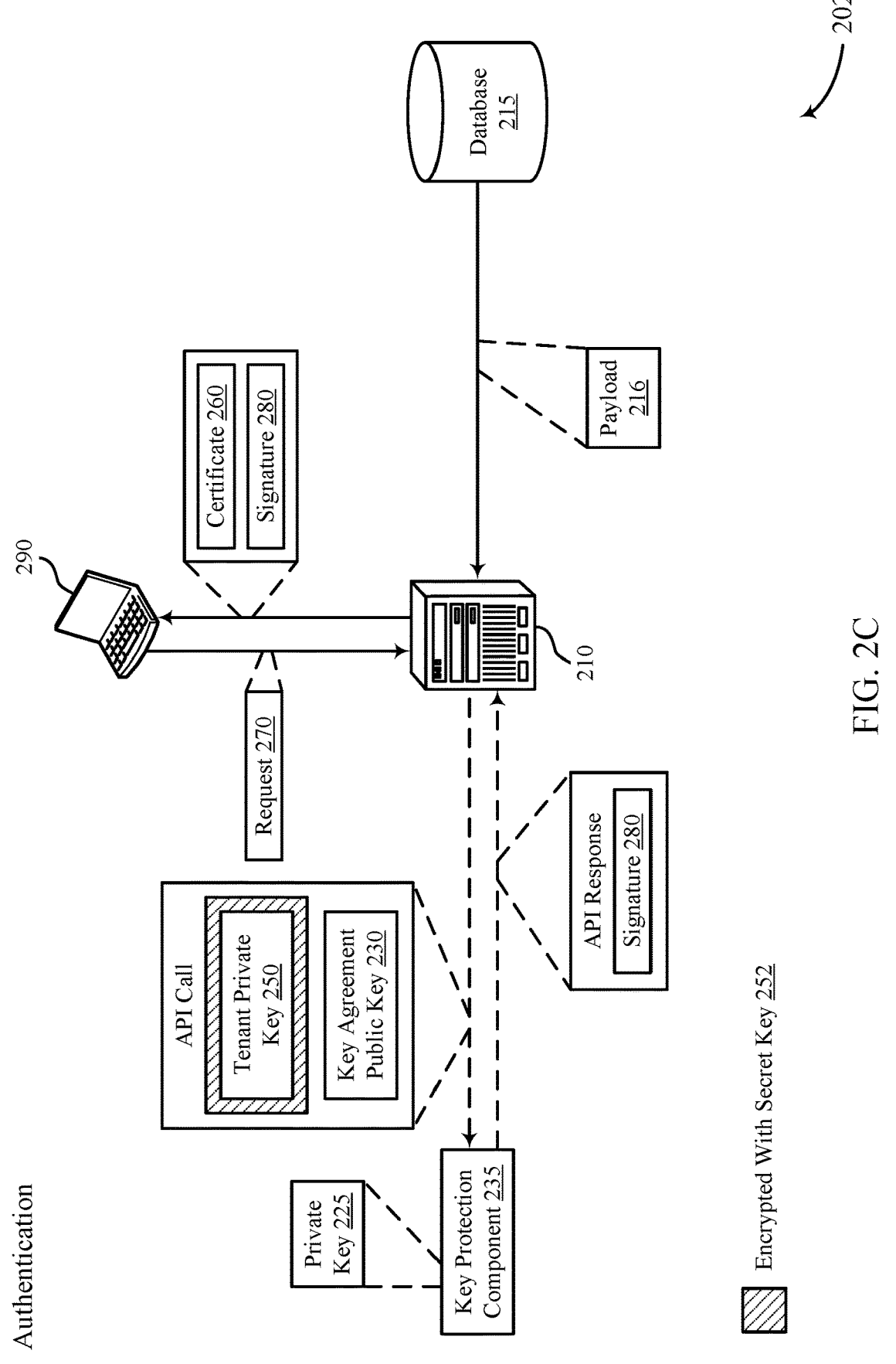

FIGS. 2A, 2B, and 2C show examples of a computing system 200, a computing system 201, and a computing system 202, respectively, that support multi-tenant hardware-backed transport layer security key management in accordance with aspects of the present disclosure. The computing systems 200 through 202 may implement or be implemented by aspects of the computing system 100. For example, the computing system 200 includes a server host 210, which may be an example of aspects of the application server 125 described with reference to FIG. 1. Likewise, the computing system 201 includes a database 215, which may be an example of aspects of the data center 120, as shown and described with reference to FIG. 1.

The computing system 200 of FIG. 2A illustrates a key provisioning process, whereby a key distribution service 205 provisions a private key 225 to a key protection component 235 of the server host 210. As described herein, the key distribution service 205 may be implemented as an HSM, a master host, or a quorum-based sharing service that uses a distributed key sharing scheme (such as a Shamir Secret Sharing scheme). The key distribution service 205 may enable the same key (such as the private key 225) to be shared across different virtual and/or physical machines within the computing system 200. In some examples, the key distribution service 205 may be supported or otherwise provided by dedicated 1P hardware. For example, a first physical/virtual machine of a IP data center (such as the data center 120 described with reference to FIG. 1) may be responsible for wrapping the private key 225 with host public keys of other physical/virtual machines within the computing system 200.

In other examples, two or more entities (such as machines or humans) supporting the key distribution service 205 may jointly create the private key 225 in accordance with a quorum-based key sharing scheme, such as a Shamir secret sharing scheme or a multi-party computation (MPC)-based scheme. In a Shamir secret sharing scheme, the private key 225 may be recreated using an M out of N scheme. That is, the entities supporting the key distribution service 205 may be unable to create (i.e., generate) the private key 225 unless a threshold number (M) of the entities (N) are present for the creation of the private key 225, as the key material (e.g., the information necessary to create the private key 225) may be distributed across the entities in such a way that any one entity is unable to create or otherwise access the private key 225. Once created, the private key 225 can be loaded into entity 1, entity 2 can obtain the private key 225 from entity 1, etc. An MPC-based scheme requires multiple parties to be involved in computing a cryptographic function. Other methods of creating/obtaining the private key 225 are not precluded.

To initiate the key provisioning process, the server host 210 may pass a host public key 220 (such as a Rivest-Shamir-Adleman (RSA) public key of the server host 210) to the key distribution service 205. In turn, the key distribution service 205 may use one or more of the key provisioning mechanisms discussed above to obtain (i.e., generate, acquire, derive) the private key 225. Thereafter, the key distribution service 205 may generate a CSR 291 using the private key 225 and send the CSR 291 to a CA 240 associated with (i.e., hosted or otherwise supported by) the multi-tenant cloud platform 115. In response to the CSR 291, the CA 240 may issue a certificate 295 for a public key associated with the private key 225. Upon receiving the certificate 295 from the CA 240, the key distribution service 205 may wrap the private key 225 with the host public key 220 (provided by the server host 210) and store both the wrapped private key 225 and the certificate 295 in the database 215 or a file system. In some implementations, the key distribution service 205 may send the wrapped private key 225 directly to the server host 210.

The server host 210 may retrieve the wrapped private key 225 from the database 215 (or obtain it directly from the key distribution service 205) and pass the wrapped private key 225 to the key protection component 235. Accordingly, the key protection component 235 may use a host private key 251 (such as an RSA private key of the server host 210) to unwrap the private key 225. In some implementations, the key protection component 235 may preserve or otherwise retain the private key 225 in a cache or other local storage location, thereby enabling the key protection component 235 to use the private key 225 for subsequent operations. In the event that the key protection component 235 is shut down or rebooted, the server host 210 may send the wrapped private key 225 to the key protection component 235 again (e.g., during application start-up).

In some implementations, the key protection component 235 may support Intel® Quick Assist Technology (QAT), which includes Intel® Key Protection Technology (KPT), and these technologies may accelerate data encryption and compression at the server host 210. For example, the key protection component 235 may provide hardware acceleration and CPU offloading capabilities for enhanced compression and decompression. The key protection component 235 may be implemented in hardware, software executed by at least one processor, firmware, or any combination thereof. Although the key protection component 235 is depicted as being separate from the server host 210, it is to be understood that the key protection component 235 may be physically integrated or co-located with other components of the server host 210. The key protection component 235 may have exclusive access to the host private key 251 (for example, an RSA private key of the server host 210), such that the host private key 251 is not stored or otherwise accessible in the memory of the server host 210.

In some implementations, the key distribution service 205 may verify the identity of the server host 210 and/or the authenticity of the host public key 220 before returning the wrapped private key 225 to the server host 210. In third-party (3P) deployments, the server host 210 may call (i.e., invoke) the key distribution service 205 each time the wrapped private key 225 is needed (e.g., each time the server host 210 (re)starts an application that uses the private key 225). In first-party (1P) deployments, the wrapped private key 225 may be stored in the database 215, along with other instances of the private key 225 wrapped with public keys of other server hosts in a sub-system (i.e., pod) of the computing system 200. In other words, the database 215 may include a first instance of the private key 225 wrapped with the host public key 220, a second instance of the private key 225 wrapped with the public key of another server host, etc. Storing wrapped private keys 225 in the database 215 may reduce the number of API calls made to the key distribution service 205, thereby resulting in lower signaling overhead and reduced latency.

The computing system 201 of FIG. 2B illustrates an example of a tenant (i.e., organization) sign-up process, whereby the server host 210 provisions a tenant private key 250 (also referred to as a TLS private key) for a tenant of the multi-tenant cloud platform 115. To begin the tenant sign-up process, the server host 210 may receive a sign-up or provisioning request from a user associated with the tenant (such as a user of the client device 290). Accordingly, the server host 210 may prompt the key protection component 235 to generate a key agreement public key 230 associated with the tenant. In some implementations, the key protection component 235 may derive a secret key 252 according to an ECDH key agreement protocol (in which two parties establish a shared secret using an elliptic-curve public/private key pair).

For example, the key protection component 235 may generate a key agreement public key pair that includes the key agreement public key 230 and a corresponding key agreement private key. The key protection component 235 may discard the key agreement private key and use the key agreement public key 230 to derive the secret key 252. That is, the key protection component 235 may generate an ephemeral public/private key pair that includes the key agreement public key 230 and a corresponding key agreement private key (not shown), discard the key agreement private key, and send the key agreement public key 230 back to the server host 210. The server host 210 may then pass the key agreement public key 230 (provisioned by the key protection component 235) to the key distribution service 205.

Thereafter, the key distribution service 205 may use one or more of the key provisioning mechanisms described herein (including with reference to FIG. 2A) to obtain a tenant private key 250 (also referred to as a TLS private key) for the tenant. The key distribution service 205 may use the tenant private key 250 to generate a CSR 245, which may include a domain name system (DNS) name 255 for a web domain associated with the tenant. The key distribution service 205 may send the CSR 245 to the CA 240 (which can be locally or externally hosted). In response, the CA 240 may issue a certificate 260 to the key distribution service 205. The certificate 260 may include a tenant public key 265 (such as a TLS public key) associated with the tenant private key 250. The certificate 260 essentially contains the tenant public key 265. By issuing the certificate 260, the CA 240 vouches for the tenant public key 265 associated with the tenant domain. Without a certificate provisioned by the CA 240, browsers may not trust the tenant private key 250.

The key distribution service 205 may use the key agreement public key 230 (provisioned by the key protection component 235) and the private key 225 (provisioned by the key distribution service 205) to generate a secret key 252 (also referred to herein as a symmetric key). The key distribution service 205 may generate the secret key 252 according to a key agreement scheme, such as ECDH. The key distribution service 205 may use the secret key 252 to encrypt the tenant private key 250. The key distribution service 205 may include the encrypted tenant private key 250, the key agreement public key 230, and the certificate 260 in a payload 216. The key distribution service 205 may store the payload 216 in the database 215.

The computing system 202 of FIG. 2C illustrates an example of a TLS authentication procedure, whereby the key protection component 235 of the server host 210 uses the tenant private key 250 to generate a signature 280 (also referred to as a digital signature or a cryptographic signature). The key protection component 235 of the server host 210 (also referred to as a key management system) may support Intel® QAT, which can help accelerate data encryption and compression at the server host 210. For example, the key protection component 235 may provide hardware acceleration and CPU offloading capabilities for enhanced compression and decompression. The key protection component 235 may be implemented in hardware, software executed by at least one processor, firmware, or any combination thereof. Although the key protection component 235 is depicted as being separate from the server host 210, it is to be understood that the key protection component 235 may be physically integrated or otherwise co-located with other components of the server host 210.

To begin the authentication process, the server host 210 may receive (e.g., via a web browser or an application running on the client device 290) a request 270 to access a web domain associated with a tenant supported by the server host 210. Upon receiving the request 270, the server host 210 may retrieve (i.e., from the database 215) a payload 216 that includes an encrypted tenant private key 250, a certificate 260, and a key agreement public key 230 associated with the tenant. The server host 210 may pass the encrypted tenant private key 250 and the key agreement public key 230 to the key protection component 235 via an API call. The key protection component 235 may use the key agreement public key 230 and the private key 225 (which is loaded into the key protection component 235 at start-up) to derive the secret key 252. The secret key 252 derived by the key protection component 235 will be the same as the secret key 252 generated by the key distribution service 205, provided that both inputs (i.e., the private key 225 and the key agreement public key 230) are the same. In other words, because the key protection component 235 and the key distribution service 205 have access to the private key 225 and the key agreement public key 230, both entities can derive the same secret key 252 (e.g., using ECDH).

After deriving/generating the secret key 252, the key protection component 235 can use the secret key 252 to decrypt the encrypted tenant private key 250. Thereafter, the key protection component 235 can use the decrypted tenant private key 250 to generate a corresponding signature 280. The key protection component 235 may then return the signature 280 to the server host 210 via an API response. In turn, the server host 210 may send the signature 280 and the certificate 260 to the client device 290. The client device 290 can use the tenant public key 265 in the certificate 260 to validate the signature 280 provided by the server host 210. If the signature 280 is valid, the client device 290 can finish establishing a TLS connection with the server host 210 (for example, by performing a client key exchange, a client handshake, and other TLS operations that one of ordinary skill in the art would readily appreciate), at which point the client device 290 can communicate with the server host 210 in a secure manner. The TLS connection may be configured such that TLS encryption is terminated at the server host 210, thereby ensuring that data does not flow in clear (i.e., unencrypted) at any point between the client device 290 and the server host 210.

Figure 3A:
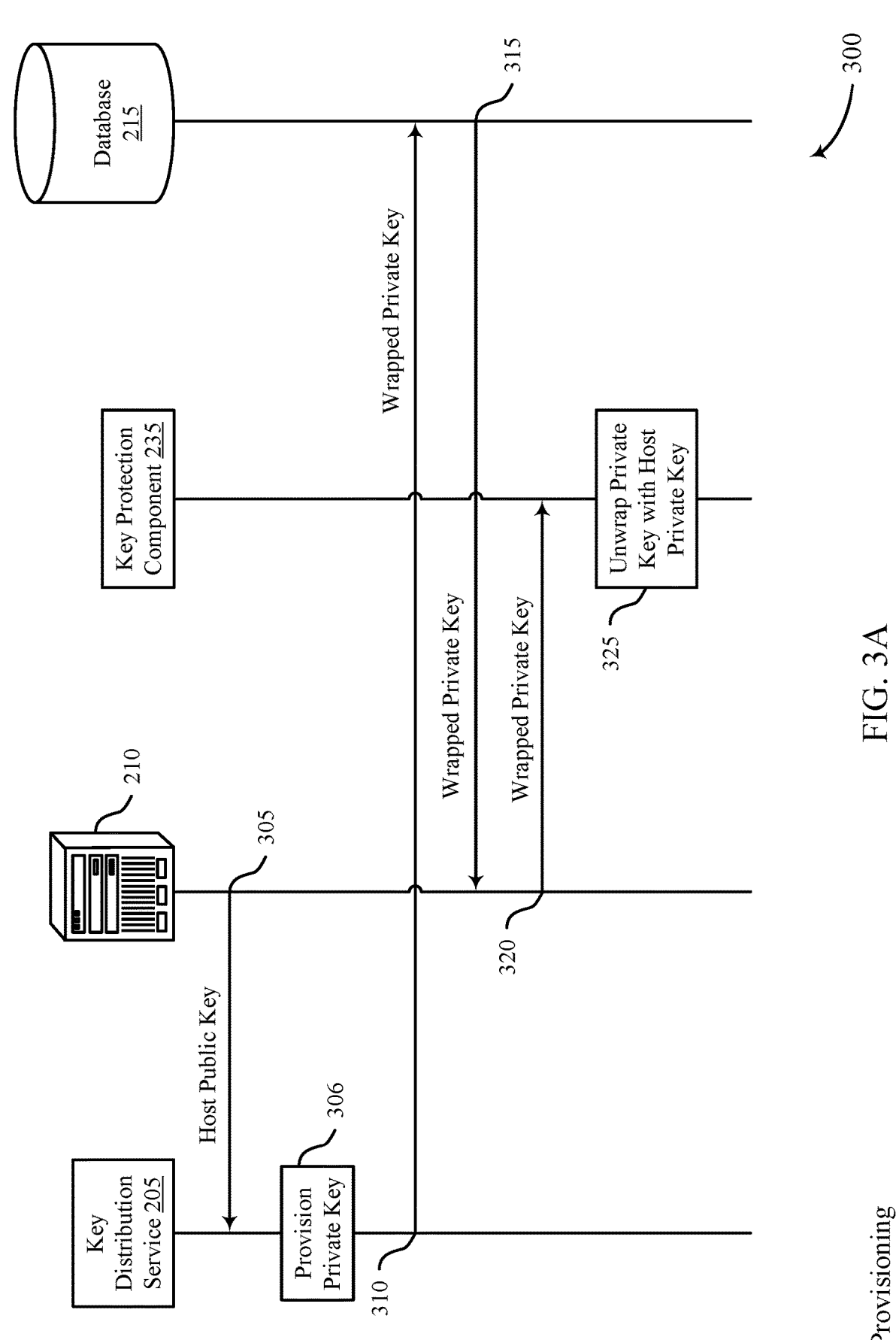
FIGS. 3A, 3B, and 3C show examples of computing systems that supports multi-tenant hardware-backed transport layer security key management in accordance with aspects of the present disclosure.
Figure 3B:
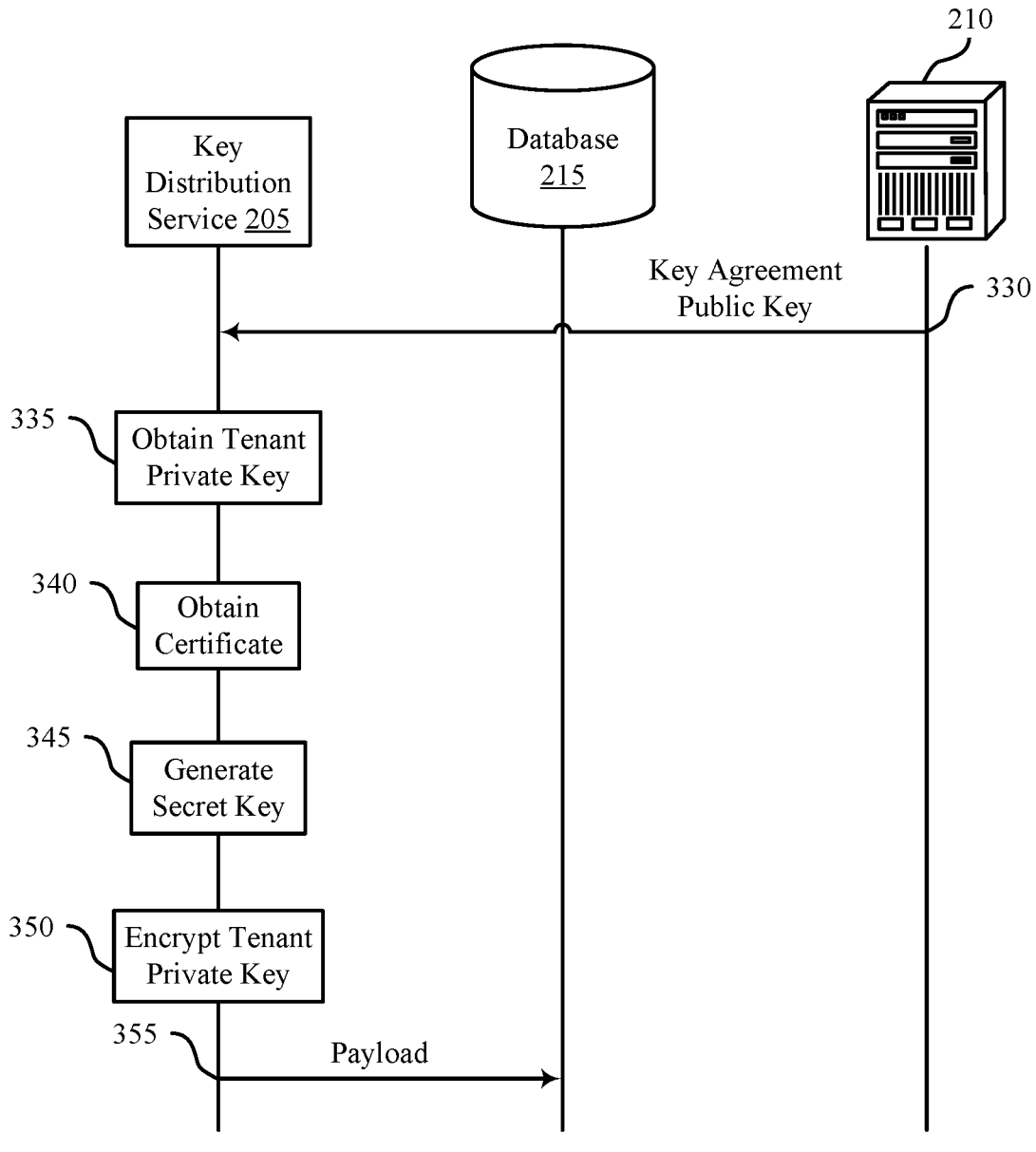
Figure 3C:
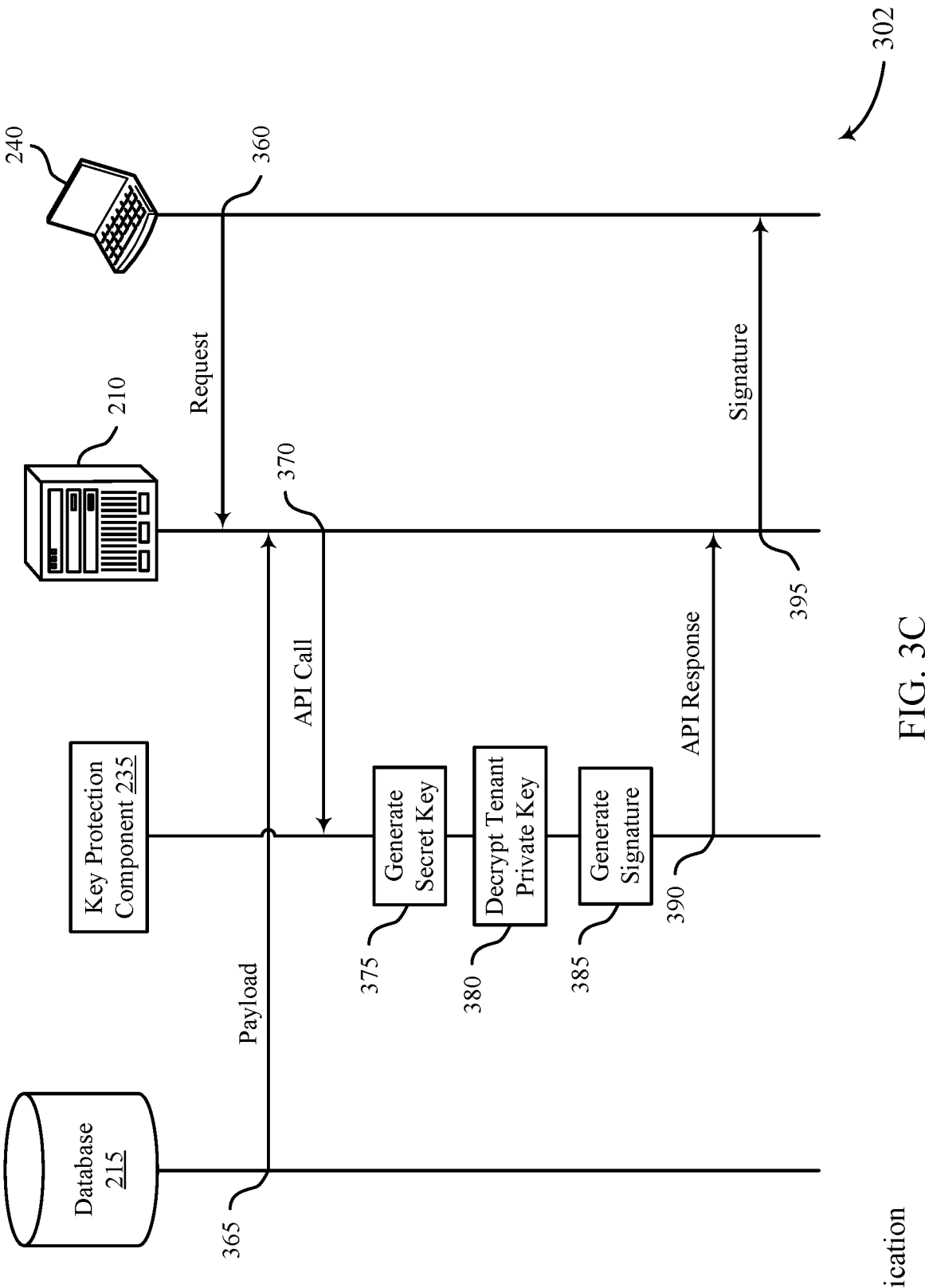

FIGS. 3A, 3B, and 3C show examples of a process flow 300, a process flow 301, and a process flow 302 that support multi-tenant hardware-backed transport layer security key management in accordance with aspects of the present disclosure. The process flows 300 through 302 may implement or be implemented by aspects of any of the computing systems 100 through 202. For example, the process flow 300 includes a server host 210 and a database 215, which may be examples of corresponding elements described herein, including with reference to FIGS. 2A through 2C. In the following description of the process flows 300 through 302, operations may be added, omitted, or performed in a different order (with respect to the exemplary order shown).

The process flow 300 of FIG. 3A illustrates a key provisioning process, whereby a key distribution service 205 provisions a private key 225 to a key protection component 235 of the server host 210. As described herein, the key distribution service 205 may be implemented as an HSM, a master host, or a quorum-based sharing service that uses a distributed key sharing scheme (such as a Shamir Secret Sharing scheme). The key distribution service 205 may enable the same key (such as the private key 225) to be shared across different virtual and/or physical machines within the computing system 200. In some examples, the key distribution service 205 may be supported or otherwise provided by dedicated 1P hardware. For example, a first physical/virtual machine of a IP data center (such as the data center 120 described with reference to FIG. 1) may be responsible for wrapping the private key 225 with host public keys of other physical/virtual machines within the computing system 200.

In other examples, two or more entities (such as machines or humans) supporting the key distribution service 205 may jointly create the private key 225 in accordance with a quorum-based key sharing scheme, such as a Shamir secret sharing scheme or a multi-party computation (MPC)-based scheme. In a Shamir secret sharing scheme, the private key 225 may be recreated using an M out of N scheme. That is, the entities supporting the key distribution service 205 may be unable to create (i.e., generate) the private key 225 unless a threshold number (M) of the entities (N) are present for the creation of the private key 225, as the key material (e.g., the information necessary to create the private key 225) may be distributed across the entities in such a way that any one entity is unable to create or otherwise access the private key 225. Once created, the private key 225 can be loaded into entity 1, entity 2 can obtain the private key 225 from entity 1, etc. An MPC-based scheme requires multiple parties to be involved in computing a cryptographic function. Other methods of creating/obtaining the private key 225 are not precluded.

At 305, the server host 210 may pass a host public key 220 (such as a Rivest-Shamir-Adleman (RSA) public key of the server host 210) to the key distribution service 205. At 306, the key distribution service 205 may use one or more of the key provisioning mechanisms discussed above to obtain (i.e., generate, acquire, derive) the private key 225. Thereafter, the key distribution service 205 may generate a CSR 291 using the private key 225 and send the CSR 291 to a CA 240 associated with (i.e., hosted or otherwise supported by) the multi-tenant cloud platform 115. In response to the CSR 291, the CA 240 may issue a certificate 295 for a public key associated with the private key 225. At 310, the key distribution service 205 may wrap the private key 225 with the host public key 220 (provided by the server host 210) and store both the wrapped private key 225 and the certificate 295 in the database 215 or a file system. In some implementations, the key distribution service 205 may send the wrapped private key 225 directly to the server host 210.

At 315, the server host 210 may retrieve the wrapped private key 225 from the database 215 (or obtain it directly from the key distribution service 205). At 320, the server host 210 may provide the wrapped private key 225 to the key protection component 235. At 325, the key protection component 235 may use a host private key 251 (such as an RSA private key of the server host 210) to unwrap the private key 225. In some implementations, the key protection component 235 may preserve or otherwise retain the private key 225 in a cache or other local storage location, thereby enabling the key protection component 235 to use the private key 225 for subsequent operations. In the event that the key protection component 235 is shut down or rebooted, the server host 210 may send the wrapped private key 225 to the key protection component 235 again (e.g., during application start-up).

In some implementations, the key protection component 235 may support Intel® Quick Assist Technology (QAT), which can help accelerate data encryption and compression at the server host 210. For example, the key protection component 235 may provide hardware acceleration and CPU offloading capabilities for enhanced compression and decompression. The key protection component 235 may be implemented in hardware, software executed by at least one processor, firmware, or any combination thereof. Although the key protection component 235 is depicted as being separate from the server host 210, it is to be understood that the key protection component 235 may be physically integrated or co-located with other components of the server host 210. The key protection component 235 may have exclusive access to the host private key 251 (for example, an RSA private key of the server host 210), such that the host private key 251 is not stored or otherwise accessible in the memory of the server host 210.

In some implementations, the key distribution service 205 may verify the identity of the server host 210 and/or the authenticity of the host public key 220 before returning the wrapped private key 225 to the server host 210. In 3P deployments, the server host 210 may call (i.e., invoke) the key distribution service 205 each time the wrapped private key 225 is needed (e.g., each time the server host 210 (re)starts an application that uses the private key 225). In 1P deployments, the wrapped private key 225 may be stored in the database 215, along with other instances of the private key 225 wrapped with public keys of other server hosts in a sub-system (i.e., pod) of the multi-tenant cloud platform 115. In other words, the database 215 may include a first instance of the private key 225 wrapped with the host public key 220, a second instance of the private key 225 wrapped with the public key of another server host, etc. Storing wrapped private keys 225 in the database 215 may reduce the number of API calls made to the key distribution service 205, thereby resulting in lower signaling overhead and reduced latency.

The process flow 301 of FIG. 3B illustrates an example of a tenant (i.e., organization) sign-up process, whereby the server host 210 provisions a tenant private key 250 (also referred to as a TLS private key) for a tenant of the multi-tenant cloud platform 115. To begin the tenant sign-up process, the server host 210 may receive a sign-up or provisioning request from a user associated with the tenant (such as a user of the client device 290). Accordingly, the server host 210 may prompt the key protection component 235 to generate a key agreement public key 230 associated with the tenant. In some implementations, the key protection component 235 may derive a secret key 252 according to an ECDH key agreement protocol (in which two parties establish a shared secret using an elliptic-curve public/private key pair).

For example, the key protection component 235 may generate a key agreement public key pair that includes the key agreement public key 230 and a corresponding key agreement private key. The key protection component 235 may discard the key agreement private key and use the key agreement public key 230 to derive the secret key 252. That is, the key protection component 235 may generate an ephemeral public/private key pair that includes the key agreement public key 230 and a corresponding key agreement private key (not shown), discard the key agreement private key, and send the key agreement public key 230 back to the server host 210. The server host 210 may then provide the key agreement public key 230 to the key distribution service 205 at 330.

At 335, the key distribution service 205 may use one or more of the key provisioning mechanisms described herein (including with reference to FIG. 2A) to obtain a tenant private key 250 (also referred to as a TLS private key) for the tenant. The key distribution service 205 may use the tenant private key 250 to generate a CSR 245, which may include a domain name system (DNS) name for a web domain associated with the tenant. The key distribution service 205 may send the CSR 245 to the CA 240 (which can be locally or externally hosted). At 340, the CA 240 may issue a certificate 260 to the key distribution service 205. The certificate 260 may include a tenant public key 265 (such as a TLS public key) associated with the tenant private key 250. The certificate 260 essentially contains the tenant public key 265. By issuing the certificate 260, the CA 240 vouches for the tenant public key 265 associated with the tenant domain. Without a certificate provisioned by the CA 240, browsers may not trust the tenant private key 250.

At 345, the key distribution service 205 may use the key agreement public key 230 (provisioned by the key protection component 235) and the private key 225 (provisioned by the key distribution service 205) to generate a secret key 252 (also referred to herein as a symmetric key). The key distribution service 205 may generate the secret key 252 according to a key agreement scheme, such as ECDH. At 350, the key distribution service 205 may use the secret key 252 to encrypt the tenant private key 250. The key distribution service 205 may include the encrypted tenant private key 250, the key agreement public key 230, and the certificate 260 in a payload 216. At 355, the key distribution service 205 may store the payload 216 in the database 215.

The process flow 302 of FIG. 3C illustrates an example of a TLS authentication procedure, whereby the key protection component 235 of the server host 210 uses the tenant private key 250 to generate a signature 280 (also referred to as a digital signature or a cryptographic signature). The key protection component 235 of the server host 210 (also referred to as a key management system) may support Intel® QAT, which can help accelerate data encryption and compression at the server host 210. For example, the key protection component 235 may provide hardware acceleration and CPU offloading capabilities for enhanced compression and decompression. The key protection component 235 may be implemented in hardware, software executed by at least one processor, firmware, or any combination thereof. Although the key protection component 235 is depicted as being separate from the server host 210, it is to be understood that the key protection component 235 may be physically integrated or otherwise co-located with other components of the server host 210.

At 360, the server host 210 may receive (e.g., via a web browser or an application running on the client device 290) a request 270 to access a web domain associated with a tenant supported by the server host 210. At 365, the server host 210 may retrieve (i.e., from the database 215) a payload 216 that includes an encrypted tenant private key 250, a certificate 260, and a key agreement public key 230 associated with the tenant. At 370, the server host 210 may provide the encrypted tenant private key 250 and the key agreement public key 230 to the key protection component 235 via an API call. At 375, the key protection component 235 may use the key agreement public key 230 and the private key 225 (which is loaded into the key protection component 235 at start-up) to derive the secret key 252. The secret key 252 derived by the key protection component 235 will be the same as the secret key 252 generated by the key distribution service 205, provided that both inputs (i.e., the private key 225 and the key agreement public key 230) are the same. In other words, because the key protection component 235 and the key distribution service 205 have access to the private key 225 and the key agreement public key 230, both entities can derive the same secret key 252 (e.g., using ECDH).

At 380, the key protection component 235 can use the secret key 252 to decrypt the encrypted tenant private key 250. At 385, the key protection component 235 can use the decrypted tenant private key 250 to generate a corresponding signature 280. At 390, the key protection component 235 may return the signature 280 to the server host 210 via an API response. At 395, the server host 210 may send the signature 280 and the certificate 260 to the client device 290. The client device 290 can use the tenant public key 265 in the certificate 260 to validate the signature 280 provided by the server host 210. If the signature 280 is valid, the client device 290 can finish establishing a TLS connection with the server host 210 (for example, by performing a client key exchange, a client handshake, and other TLS operations that one of ordinary skill in the art would readily appreciate), at which point the client device 290 can communicate with the server host 210 in a secure manner. The TLS connection may be configured such that TLS encryption is terminated at the server host 210, thereby ensuring that data does not flow in clear (i.e., unencrypted) at any point between the client device 290 and the server host 210.

Figure 4:
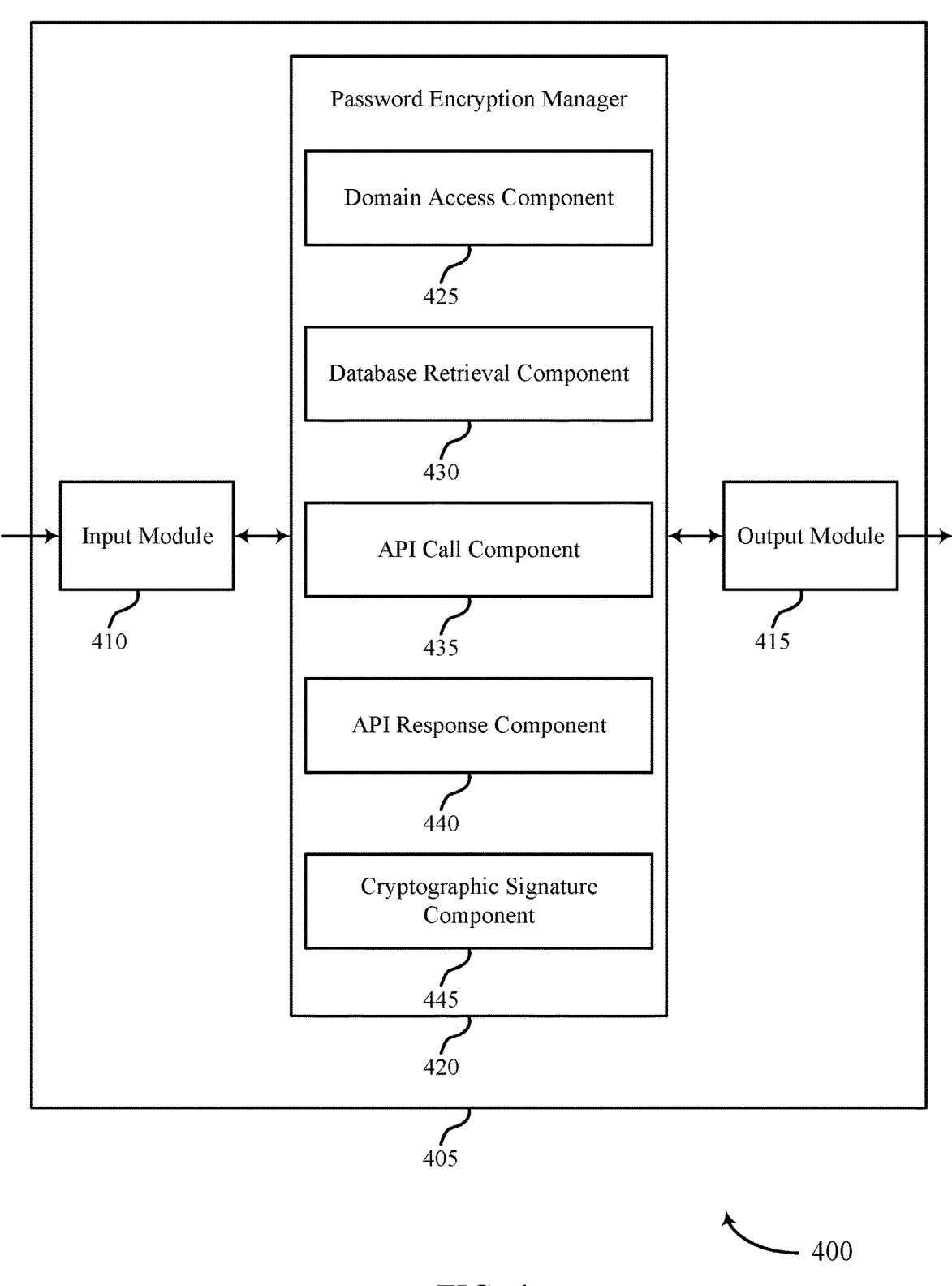
FIG. 4 shows a block diagram of an apparatus that supports multi-tenant hardware-backed transport layer security key management in accordance with aspects of the present disclosure.

FIG. 4 shows a block diagram 400 of a device 405 that supports multi-tenant hardware-backed transport layer security key management in accordance with aspects of the present disclosure. The device 405 may include an input module 410, an output module 415, and a password encryption manager 420. The device 405, or one of more components of the device 405 (e.g., the input module 410, the output module 415, and the password encryption manager

420), may include at least one processor, which may be coupled with at least one memory, to support the described techniques. Each of these components may be in communication with one another (e.g., via one or more buses).

The input module 410 may manage input signals for the device 405. For example, the input module 410 may identify input signals based on an interaction with a modem, a keyboard, a mouse, a touchscreen, or a similar device. These input signals may be associated with user input or processing at other components or devices. In some cases, the input module 410 may utilize an operating system such as iOS®, ANDROID®, MS-DOS®, MS-WINDOWS®, OS/2®, UNIX®, LINUX®, or another known operating system to handle input signals. The input module 410 may send aspects of these input signals to other components of the device 405 for processing. For example, the input module 410 may transmit input signals to the password encryption manager 420 to support multi-tenant hardware-backed transport layer security key management. In some cases, the input module 410 may be a component of an I/O controller 610 as described with reference to FIG. 6.

The output module 415 may manage output signals for the device 405. For example, the output module 415 may receive signals from other components of the device 405, such as the password encryption manager 420, and may transmit these signals to other components or devices. In some examples, the output module 415 may transmit output signals for display in a user interface, for storage in a database or data store, for further processing at a server or server cluster, or for any other processes at any number of devices or systems. In some cases, the output module 415 may be a component of an I/O controller 610 as described with reference to FIG. 6.

For example, the password encryption manager 420 may include a domain access component 425, a database retrieval component 430, an API call component 435, an API response component 440, a signature component 445, or any combination thereof. In some examples, the password encryption manager 420, or various components thereof, may be configured to perform various operations (e.g., receiving, monitoring, transmitting) using or otherwise in cooperation with the input module 410, the output module 415, or both. For example, the password encryption manager 420 may receive information from the input module 410, send information to the output module 415, or be integrated in combination with the input module 410, the output module 415, or both to receive information, transmit information, or perform various other operations as described herein.

The password encryption manager 420 may support data processing in accordance with examples disclosed herein. The domain access component 425 may be configured to or otherwise capable of receiving, at a server host, a request to access a web domain associated with a tenant of a multi-tenant cloud platform. The database retrieval component 430 may be configured to or otherwise capable of retrieving, from a database associated with the multi-tenant cloud platform, a tenant private key associated with the tenant and a certificate including a tenant public key associated with the tenant, where the tenant private key is encrypted with a secret key derived from a key agreement public key associated with the tenant and a private key provisioned to a key protection component of the server host. The API call component 435 may be configured to or otherwise capable of transmitting, to the key protection component, an application programming interface (API) call including the encrypted tenant private key and the key agreement public key retrieved from the database. The API response component 440 may be configured to or otherwise capable of receiving, from the key protection component, an API response including a signature associated with the tenant private key. The signature component 445 may be configured to or otherwise capable of providing, to a client device associated with the request to access the web domain of the tenant, the certificate retrieved from the database and the signature from the API response, where the certificate is used to verify the signature.

Figure 5:
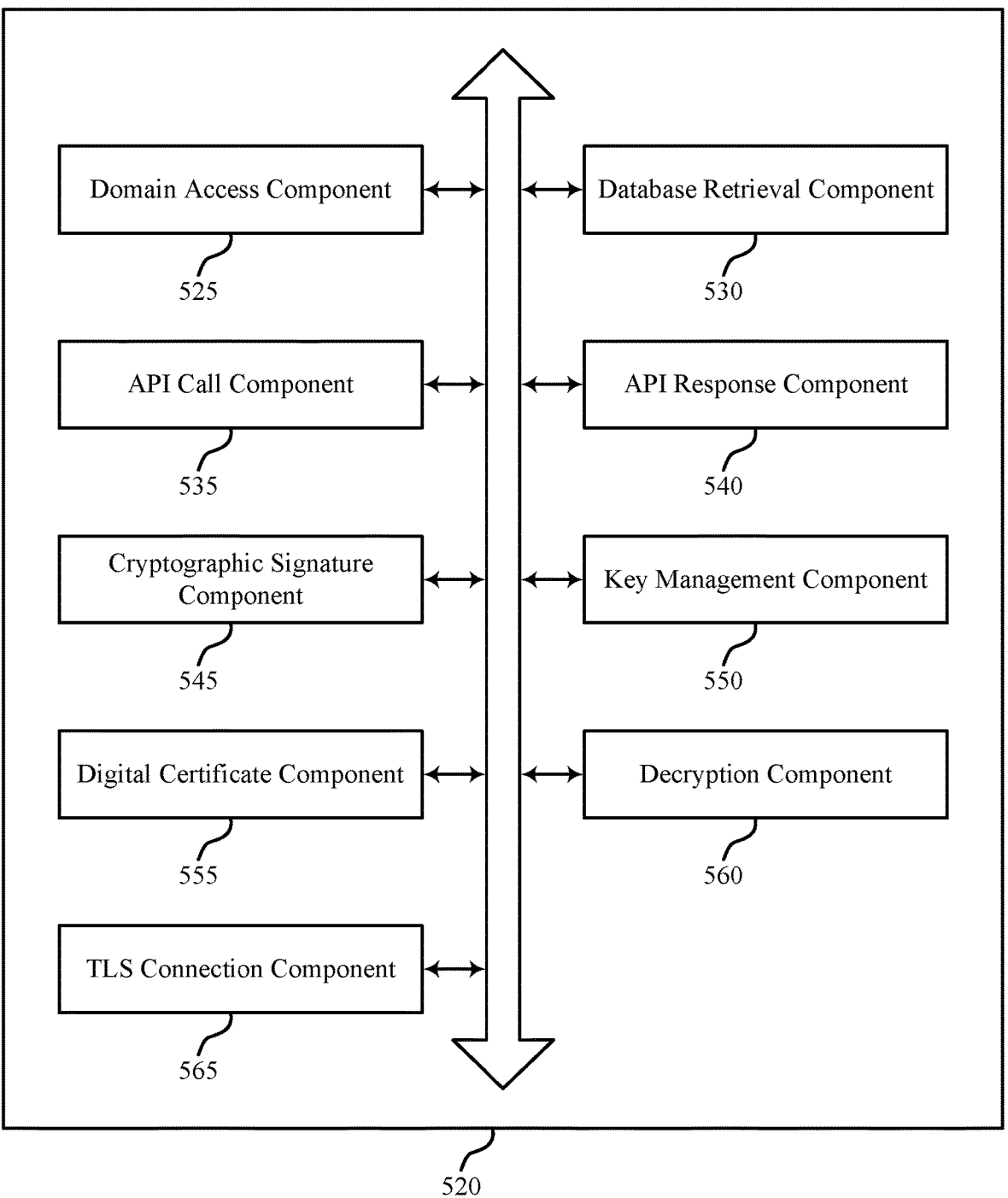
FIG. 5 shows a block diagram of a password encryption manager that supports multi-tenant hardware-backed transport layer security key management in accordance with aspects of the present disclosure.

FIG. 5 shows a block diagram 500 of a password encryption manager 520 that supports multi-tenant hardware-backed transport layer security key management in accordance with aspects of the present disclosure. The password encryption manager 520 may be an example of aspects of a password encryption manager or a password encryption manager 420, or both, as described herein. The password encryption manager 520, or various components thereof, may be an example of means for performing various aspects of multi-tenant hardware-backed transport layer security key management as described herein. For example, the password encryption manager 520 may include a domain access component 525, a database retrieval component 530, an API call component 535, an API response component 540, a signature component 545, a key management component 550, a certificate component 555, a decryption component 560, an TLS connection component 565, or any combination thereof. Each of these components, or components of subcomponents thereof (e.g., one or more processors, one or more memories), may communicate, directly or indirectly, with one another (e.g., via one or more buses).

The password encryption manager 520 may support data processing in accordance with examples disclosed herein. The domain access component 525 may be configured to or otherwise capable of receiving, at a server host, a request to access a web domain associated with a tenant of a multi-tenant cloud platform. The database retrieval component 530 may be configured to or otherwise capable of retrieving, from a database associated with the multi-tenant cloud platform, a tenant private key associated with the tenant and a certificate including a tenant public key associated with the tenant, where the tenant private key is encrypted with a secret key derived from a key agreement public key associated with the tenant and a private key provisioned to a key protection component of the server host. The API call component 535 may be configured to or otherwise capable of transmitting, to the key protection component, an application programming interface (API) call including the encrypted tenant private key and the key agreement public key retrieved from the database. The API response component 540 may be configured to or otherwise capable of receiving, from the key protection component, an API response including a signature associated with the tenant private key. The signature component 545 may be configured to or otherwise capable of providing, to a client device associated with the request to access the web domain of the tenant, the certificate retrieved from the database and the signature from the API response, where the certificate is used to verify the signature.

In some examples, the domain access component 525 may be configured to or otherwise capable of receiving a sign-up or provisioning request for the web domain associated with the tenant. In some examples, the key management component 550 may be configured to or otherwise capable of generating the tenant private key in response to the sign-up or provisioning request. In some examples, the certificate component 555 may be configured to or otherwise capable of using the tenant private key to generate a certificate signing request (CSR) for the web domain, the CSR including a domain name system (DNS) name for the web domain. In some examples, the certificate component 555 may be configured to or otherwise capable of transmitting the CSR to a certificate authority (CA) selected by the tenant.

In some examples, the certificate component 555 may be configured to or otherwise capable of receiving the certificate from the CA in accordance with the CSR. In some examples, the certificate component 555 may be configured to or otherwise capable of storing the certificate in association with the encrypted tenant private key.

In some examples, generate the secret key using the key agreement public key provided in the API call and the private key provisioned to the key protection component. In some examples, decrypt the tenant private key using the secret key. In some examples, generate the signature using the tenant private key. In some examples, include the signature in the API response.

In some examples, the TLS connection component 565 may be configured to or otherwise capable of establishing a secure connection with the client device that requested access to the web domain of the tenant based on performing a successful transport layer security (TLS) handshake procedure. In some examples, the TLS connection component 565 may be configured to or otherwise capable of exchanging data with the client device via the secure connection, where TLS encryption of the data is performed by the server host.

In some examples, the key management component 550 may be configured to or otherwise capable of transmitting, to the key protection component, a message including the private key wrapped by a host public key associated with the server host.

In some examples, unwrap the private key using a host private key associated with the server host, where the host private key is locally accessible to the key protection component.

In some examples, the database retrieval component 530 may be configured to or otherwise capable of storing, in the database, the private key wrapped by the host public key associated with the server host.

In some examples, the database includes two or more instances of the private key wrapped by respective host public keys associated with server hosts of a sub-system of the multi-tenant cloud platform that includes the server host.

In some examples, the private key is provisioned by a key distribution service that includes at least one of a hardware security module (HSM), or a master host, or a quorum-based key sharing service. In some examples, the key agreement public key is generated by the key protection component of the server host.

In some examples, the database includes respective tenant private keys and key agreement public keys for a set of multiple tenants of the multi-tenant cloud platform. In some examples, the respective tenant private keys are encrypted with respective secret keys derived from the respective key agreement public keys and the private key provisioned to the key protection component.

In some examples, the tenant private key and the tenant public key are used for transport layer security (TLS) authentication.

In some examples, the private key is associated with a second certificate provisioned by a certificate authority (CA) of the multi-tenant cloud platform.

In some examples, the secret key is generated using an Elliptic Curve Diffie-Hellman (ECDH) key agreement scheme.

Figure 6:
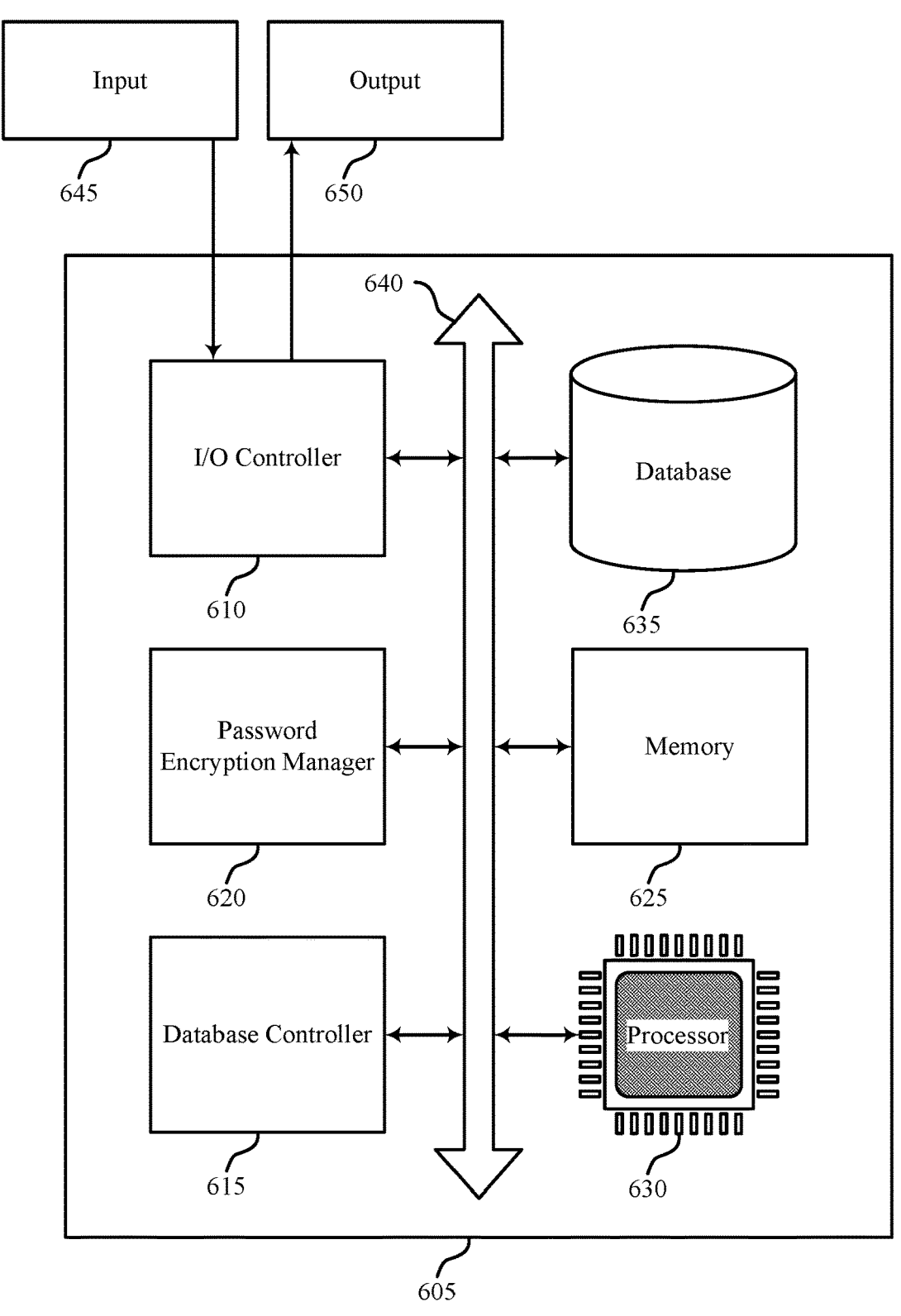
FIG. 6 shows a diagram of a system including a device that supports multi-tenant hardware-backed transport layer security key management in accordance with aspects of the present disclosure.

FIG. 6 shows a diagram of a system 600 including a device 605 that supports multi-tenant hardware-backed transport layer security key management in accordance with aspects of the present disclosure. The device 605 may be an example of or include the components of a device 405 as described herein. The device 605 may include components for bi-directional data communications including components for transmitting and receiving communications, such as a password encryption manager 620, an I/O controller 610, a database controller 615, at least one memory 625, at least one processor 630, and a database 635. These components may be in electronic communication or otherwise coupled (e.g., operatively, communicatively, functionally, electronically, electrically) via one or more buses (e.g., a bus 640).

The I/O controller 610 may manage input signals 645 and output signals 650 for the device 605. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. In other cases, the I/O controller 610 may represent or interact with a modem, a keyboard, a mouse, a touchscreen, or a similar device. In some cases, the I/O controller 610 may be implemented as part of a processor 630. In some examples, a user may interact with the device 605 via the I/O controller 610 or via hardware components controlled by the I/O controller 610.

The database controller 615 may manage data storage and processing in a database 635. In some cases, a user may interact with the database controller 615. In other cases, the database controller 615 may operate automatically without user interaction. The database 635 may be an example of a single database, a distributed database, multiple distributed databases, a data store, a data lake, or an emergency backup database.

Memory 625 may include random-access memory (RAM) and ROM. The memory 625 may store computer-readable, computer-executable software including instructions that, when executed, cause at least one processor 630 to perform various functions described herein. In some cases, the memory 625 may contain, among other things, a BIOS which may control basic hardware or software operation such as the interaction with peripheral components or devices. The memory 625 may be an example of a single memory or multiple memories. For example, the device 605 may include one or more memories 625.

The processor 630 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 630 may be configured to operate a memory array using a memory controller. In other cases, a memory controller may be integrated into the processor 630. The processor 630 may be configured to execute computer-readable instructions stored in at least one memory 625 to perform various functions (e.g., functions or tasks supporting multi-tenant hardware-backed transport layer security key management). The processor 630 may be an example of a single processor or multiple processors. For example, the device 605 may include one or more processors 630.

The password encryption manager 620 may support data processing in accordance with examples disclosed herein. For example, the password encryption manager 620 may be configured to or otherwise capable of receiving, at a server host, a request to access a web domain associated with a tenant of a multi-tenant cloud platform. The password encryption manager 620 may be configured to or otherwise capable of retrieving, from a database associated with the multi-tenant cloud platform, a tenant private key associated with the tenant and a certificate including a tenant public key associated with the tenant, where the tenant private key is encrypted with a secret key derived from a key agreement public key associated with the tenant and a private key provisioned to a key protection component of the server host. The password encryption manager 620 may be configured to or otherwise capable of transmitting, to the key protection component, an application programming interface (API) call including the encrypted tenant private key and the key agreement public key retrieved from the database. The password encryption manager 620 may be configured to or otherwise capable of receiving, from the key protection component, an API response including a signature associated with the tenant private key. The password encryption manager 620 may be configured to or otherwise capable of providing, to a client device associated with the request to access the web domain of the tenant, the certificate retrieved from the database and the signature from the API response, where the certificate is used to verify the signature.

By including or configuring the password encryption manager 620 in accordance with examples as described herein, the device 605 may support techniques for improved network security, reduced latency, greater resiliency, lower storage overhead, and improved scalability, among other benefits.

FIG. 7 shows a flowchart illustrating a method 700 that supports multi-tenant hardware-backed transport layer security key management in accordance with aspects of the present disclosure. The operations of the method 700 may be implemented by a computing system or its components as described herein. For example, the operations of the method 700 may be performed by a computing system as described with reference to FIGS. 1 through 6. In some examples, a computing system may execute a set of instructions to control the functional elements of the computing system to perform the described functions. Additionally, or alternatively, the computing system may perform aspects of the described functions using special-purpose hardware.

At 705, the method may include receiving, at a server host, a request to access a web domain associated with a tenant of a multi-tenant cloud platform. The operations of 705 may be performed in accordance with examples disclosed herein. In some examples, aspects of the operations of 705 may be performed by a domain access component 525 as described with reference to FIG. 5.

At 710, the method may include retrieving, from a database associated with the multi-tenant cloud platform, a tenant private key associated with the tenant and a certificate including a tenant public key associated with the tenant, where the tenant private key is encrypted with a secret key derived from a key agreement public key associated with the tenant and a private key provisioned to a key protection component of the server host. The operations of 710 may be performed in accordance with examples disclosed herein. In some examples, aspects of the operations of 710 may be performed by a database retrieval component 530 as described with reference to FIG. 5.

At 715, the method may include transmitting, to the key protection component, an API call including the encrypted tenant private key and the key agreement public key retrieved from the database. The operations of 715 may be performed in accordance with examples disclosed herein. In some examples, aspects of the operations of 715 may be performed by an API call component 535 as described with reference to FIG. 5.

At 720, the method may include receiving, from the key protection component, an API response including a signature associated with the tenant private key. The operations of 720 may be performed in accordance with examples disclosed herein. In some examples, aspects of the operations of 720 may be performed by an API response component 540 as described with reference to FIG. 5.

At 725, the method may include providing, to a client device associated with the request to access the web domain of the tenant, the certificate retrieved from the database and the signature from the API response, where the certificate is used to verify the signature. The operations of 725 may be performed in accordance with examples disclosed herein. In some examples, aspects of the operations of 725 may be performed by a signature component 545 as described with reference to FIG. 5.

A method for data processing by an apparatus is described. The method may include receiving, at a server host, a request to access a web domain associated with a tenant of a multi-tenant cloud platform, retrieving, from a database associated with the multi-tenant cloud platform, a tenant private key associated with the tenant and a certificate including a tenant public key associated with the tenant, where the tenant private key is encrypted with a secret key derived from a key agreement public key associated with the tenant and a private key provisioned to a key protection component of the server host, transmitting, to the key protection component, an application programming interface (API) call including the encrypted tenant private key and the key agreement public key retrieved from the database, receiving, from the key protection component, an access point (AP) I response including a signature associated with the tenant private key, and providing, to a client device associated with the request to access the web domain of the tenant, the certificate retrieved from the database and the signature from the API response, where the certificate is used to verify the signature.

An apparatus for data processing is described. The apparatus may include one or more memories storing processor executable code, and one or more processors coupled with the one or more memories. The one or more processors may individually or collectively operable to execute the code to cause the apparatus to receive, at a server host, a request to access a web domain associated with a tenant of a multi-tenant cloud platform, retrieve, from a database associated with the multi-tenant cloud platform, a tenant private key associated with the tenant and a certificate including a tenant public key associated with the tenant, where the tenant private key is encrypted with a secret key derived from a key agreement public key associated with the tenant and a private key provisioned to a key protection component of the server host, transmit, to the key protection component, an application programming interface (API) call including the encrypted tenant private key and the key agreement public key retrieved from the database, receive, from the key protection component, an API response including a signature associated with the tenant private key, and provide, to a client device associated with the request to access the web domain of the tenant, the certificate retrieved from the database and the signature from the API response, where the certificate is used to verify the signature.

Another apparatus for data processing is described. The apparatus may include means for receiving, at a server host, a request to access a web domain associated with a tenant of a multi-tenant cloud platform, means for retrieving, from a database associated with the multi-tenant cloud platform, a tenant private key associated with the tenant and a certificate including a tenant public key associated with the tenant, where the tenant private key is encrypted with a secret key derived from a key agreement public key associated with the tenant and a private key provisioned to a key protection component of the server host, means for transmitting, to the key protection component, an application programming interface (API) call including the encrypted tenant private key and the key agreement public key retrieved from the database, means for receiving, from the key protection component, an API response including a signature associated with the tenant private key, and means for providing, to a client device associated with the request to access the web domain of the tenant, the certificate retrieved from the database and the signature from the API response, where the certificate is used to verify the signature.

A non-transitory computer-readable medium storing code for data processing is described. The code may include instructions executable by a processor to receive, at a server host, a request to access a web domain associated with a tenant of a multi-tenant cloud platform, retrieve, from a database associated with the multi-tenant cloud platform, a tenant private key associated with the tenant and a certificate including a tenant public key associated with the tenant, where the tenant private key is encrypted with a secret key derived from a key agreement public key associated with the tenant and a private key provisioned to a key protection component of the server host, transmit, to the key protection component, an application programming interface (API) call including the encrypted tenant private key and the key agreement public key retrieved from the database, receive, from the key protection component, an API response including a signature associated with the tenant private key, and provide, to a client device associated with the request to access the web domain of the tenant, the certificate retrieved from the database and the signature from the API response, where the certificate is used to verify the signature.

Some examples of the method, apparatus, and non-transitory computer-readable medium described herein may further include operations, features, means, or instructions for receiving a sign-up or provisioning request for the web domain associated with the tenant, generating the tenant private key in response to the sign-up or provisioning request, using the tenant private key to generate a certificate signing request (CSR) for the web domain, the CSR including a domain name system (DNS) name for the web domain, and transmitting the CSR to a certificate authority (CA) selected by the tenant.

Some examples of the method, apparatus, and non-transitory computer-readable medium described herein may further include operations, features, means, or instructions for receiving the certificate from the CA in accordance with the CSR and storing the certificate in association with the encrypted tenant private key.

Some examples of the method, apparatus, and non-transitory computer-readable medium described herein may further include operations, features, means, or instructions for generate the secret key using the key agreement public key provided in the API call and the private key provisioned to the key protection component, decrypt the tenant private key using the secret key, generate the signature using the tenant private key, and include the signature in the API response.

Some examples of the method, apparatus, and non-transitory computer-readable medium described herein may further include operations, features, means, or instructions for establishing a secure connection with the client device that requested access to the web domain of the tenant based on performing a successful transport layer security (TLS) handshake procedure and exchanging data with the client device via the secure connection, where TLS encryption of the data may be performed by the server host.

Some examples of the method, apparatus, and non-transitory computer-readable medium described herein may further include operations, features, means, or instructions for transmitting, to the key protection component, a message including the private key wrapped by a host public key associated with the server host.

In some examples of the method, apparatus, and non-transitory computer-readable medium described herein, unwrap the private key using a host private key associated with the server host, where the host private key may be locally accessible to the key protection component.

Some examples of the method, apparatus, and non-transitory computer-readable medium described herein may further include operations, features, means, or instructions for storing, in the database, the private key wrapped by the host public key associated with the server host.

In some examples of the method, apparatus, and non-transitory computer-readable medium described herein, the database includes two or more instances of the private key wrapped by respective host public keys associated with server hosts of a sub-system of the multi-tenant cloud platform that includes the server host.

In some examples of the method, apparatus, and non-transitory computer-readable medium described herein, the private key may be provisioned by a key distribution service that includes at least one of a hardware security module (HSM), or a master host, or a quorum-based key sharing service and the key agreement public key may be generated by the key protection component of the server host.

In some examples of the method, apparatus, and non-transitory computer-readable medium described herein, the database includes respective tenant private keys and key agreement public keys for a set of multiple tenants of the multi-tenant cloud platform and the respective tenant private keys may be encrypted with respective secret keys derived from the respective key agreement public keys and the private key provisioned to the key protection component.

In some examples of the method, apparatus, and non-transitory computer-readable medium described herein, the tenant private key and the tenant public key may be used for transport layer security (TLS) authentication.

In some examples of the method, apparatus, and non-transitory computer-readable medium described herein, the private key may be associated with a second certificate provisioned by a certificate authority (CA) of the multi-tenant cloud platform.

In some examples of the method, apparatus, and non-transitory computer-readable medium described herein, the secret key may be generated using an Elliptic Curve Diffie-Hellman (ECDH) key agreement scheme.

The following provides an overview of aspects of the present disclosure:

Aspect 1: A method for data processing, comprising: receiving, at a server host, a request to access a web domain associated with a tenant of a multi-tenant cloud platform; retrieving, from a database associated with the multi-tenant cloud platform, a tenant private key associated with the tenant and a certificate comprising a tenant public key associated with the tenant, wherein the tenant private key is encrypted with a secret key derived from a key agreement public key associated with the tenant and a private key provisioned to a key protection component of the server host; transmitting, to the key protection component, an application programming interface (API) call comprising the encrypted tenant private key and the key agreement public key retrieved from the database; receiving, from the key protection component, an API response comprising a signature associated with the tenant private key; and providing, to a client device associated with the request to access the web domain of the tenant, the certificate retrieved from the database and the signature from the API response, wherein the certificate is used to verify the signature.

Aspect 2: The method of aspect 1, further comprising: receiving a sign-up or provisioning request for the web domain associated with the tenant; generating the tenant private key in response to the sign-up or provisioning request; using the tenant private key to generate a certificate signing request (CSR) for the web domain, the CSR comprising a domain name system (DNS) name for the web domain; and transmitting the CSR to a certificate authority (CA) selected by the tenant.

Aspect 3: The method of aspect 2, further comprising: receiving the certificate from the CA in accordance with the CSR; and storing the certificate in association with the encrypted tenant private key.

Aspect 4: The method of any of aspects 1 through 3, wherein the API call is configured to cause the key protection component to generate the secret key using the key agreement public key provided in the API call and the private key provisioned to the key protection component; decrypt the tenant private key using the secret key; generate the signature using the tenant private key; and include the signature in the API response.

Aspect 5: The method of any of aspects 1 through 4, further comprising: establishing a secure connection with the client device that requested access to the web domain of the tenant based at least in part on performing a successful transport layer security (TLS) handshake procedure; and exchanging data with the client device via the secure connection, wherein TLS encryption of the data is performed by the server host.

Aspect 6: The method of any of aspects 1 through 5, further comprising: transmitting, to the key protection component, a message comprising the private key wrapped by a host public key associated with the server host.

Aspect 7: The method of aspect 6, wherein the message is configured to cause the key protection component to unwrap the private key using a host private key associated with the server host, wherein the host private key is locally accessible to the key protection component.

Aspect 8: The method of any of aspects 6 through 7, further comprising: storing, in the database, the private key wrapped by the host public key associated with the server host.

Aspect 9: The method of any of aspects 1 through 8, wherein the database comprises two or more instances of the private key wrapped by respective host public keys associated with server hosts of a sub-system of the multi-tenant cloud platform that includes the server host.

Aspect 10: The method of any of aspects 1 through 9, wherein the private key is provisioned by a key distribution service that comprises at least one of a hardware security module (HSM), or a master host, or a quorum-based key sharing service; and the key agreement public key is generated by the key protection component of the server host.

Aspect 11: The method of any of aspects 1 through 10, wherein the database comprises respective tenant private keys and key agreement public keys for a plurality of tenants of the multi-tenant cloud platform; and the respective tenant private keys are encrypted with respective secret keys derived from the respective key agreement public keys and the private key provisioned to the key protection component.

Aspect 12: The method of any of aspects 1 through 11, wherein the tenant private key and the tenant public key are used for transport layer security (TLS) authentication.

Aspect 13: The method of any of aspects 1 through 12, wherein the private key is associated with a second certificate provisioned by a certificate authority (CA) of the multi-tenant cloud platform.

Aspect 14: The method of any of aspects 1 through 13, wherein the secret key is generated using an Elliptic Curve Diffie-Hellman (ECDH) key agreement scheme.

Aspect 15: An apparatus for data processing, comprising one or more memories storing processor-executable code, and one or more processors coupled with the one or more memories and individually or collectively operable to execute the code to cause the apparatus to perform a method of any of aspects 1 through 14.

Aspect 16: An apparatus for data processing, comprising at least one means for performing a method of any of aspects 1 through 14.

Aspect 17: A non-transitory computer-readable medium storing code for data processing, the code comprising instructions executable by a processor to perform a method of any of aspects 1 through 14.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:

receiving, at a server host, a request to access a web domain associated with a tenant of a multi-tenant cloud platform;

retrieving, from a database associated with the multi-tenant cloud platform, a tenant private key associated with the tenant and a certificate comprising a tenant public key associated with the tenant, wherein the tenant private key is encrypted with a secret key derived from a key agreement public key associated with the tenant and a private key provisioned to a key protection component of the server host;

transmitting, to the key protection component, an application programming interface (API) call comprising the encrypted tenant private key and the key agreement public key retrieved from the database;

receiving, from the key protection component, an API response comprising a signature associated with the tenant private key; and providing, to a client device associated with the request to access the web domain of the tenant, the certificate retrieved from the database and the signature from the API response, wherein the certificate is used to verify the signature.

2. The method of claim 1, further comprising:

receiving a sign-up or provisioning request for the web domain associated with the tenant;

generating the tenant private key in response to the sign-up or provisioning request;

using the tenant private key to generate a certificate signing request (CSR) for the web domain, the CSR comprising a domain name system (DNS) name for the web domain; and transmitting the CSR to a certificate authority (CA) selected by the tenant.

3. The method of claim 2, further comprising:

receiving the certificate from the CA in accordance with the CSR; and storing the certificate in association with the encrypted tenant private key.

4. The method of claim 1, wherein the API call is configured to cause the key protection component to:

generate the secret key using the key agreement public key provided in the API call and the private key provisioned to the key protection component;

decrypt the tenant private key using the secret key;

generate the signature using the tenant private key; and include the signature in the API response.

5. The method of claim 1, further comprising:

establishing a secure connection with the client device that requested access to the web domain of the tenant based at least in part on performing a successful transport layer security (TLS) handshake procedure; and exchanging data with the client device via the secure connection, wherein TLS encryption of the data is performed by the server host.

6. The method of claim 1, further comprising:

transmitting, to the key protection component, a message comprising the private key wrapped by a host public key associated with the server host.

7. The method of claim 6, wherein the message is configured to cause the key protection component to unwrap the private key using a host private key associated with the server host, wherein the host private key is locally accessible to the key protection component.

8. The method of claim 6, further comprising:

storing, in the database, the private key wrapped by the host public key associated with the server host.

9. The method of claim 1, wherein the database comprises two or more instances of the private key wrapped by respective host public keys associated with server hosts of a sub-system of the multi-tenant cloud platform that includes the server host.

10. The method of claim 1, wherein:

the private key is provisioned by a key distribution service that comprises at least one of a hardware security module (HSM), or a master host, or a quorum-based key sharing service; and the key agreement public key is generated by the key protection component of the server host.

11. The method of claim 1, wherein:

the database comprises respective tenant private keys and key agreement public keys for a plurality of tenants of the multi-tenant cloud platform; and the respective tenant private keys are encrypted with respective secret keys derived from the respective key agreement public keys and the private key provisioned to the key protection component.

12. The method of claim 1, wherein the tenant private key and the tenant public key are used for transport layer security (TLS) authentication.

13. The method of claim 1, wherein the private key is associated with a second certificate provisioned by a certificate authority (CA) of the multi-tenant cloud platform.

14. The method of claim 1, wherein the secret key is generated using an Elliptic Curve Diffie-Hellman (ECDH) key agreement scheme.

15. An apparatus for data processing, comprising:

one or more memories storing processor-executable code; and one or more processors coupled with the one or more memories and individually or collectively operable to execute the code to cause the apparatus to:

receive, at a server host, a request to access a web domain associated with a tenant of a multi-tenant cloud platform;

retrieve, from a database associated with the multi-tenant cloud platform, a tenant private key associated with the tenant and a certificate comprising a tenant public key associated with the tenant, wherein the tenant private key is encrypted with a secret key derived from a key agreement public key associated with the tenant and a private key provisioned to a key protection component of the server host;

transmit, to the key protection component, an application programming interface (API) call comprising the encrypted tenant private key and the key agreement public key retrieved from the database;

receive, from the key protection component, an API response comprising a signature associated with the tenant private key; and provide, to a client device associated with the request to access the web domain of the tenant, the certificate retrieved from the database and the signature from the API response, wherein the certificate is used to verify the signature.

16. The apparatus of claim 15, wherein the one or more processors are individually or collectively further operable to execute the code to cause the apparatus to:

receive a sign-up or provisioning request for the web domain associated with the tenant;

generate the tenant private key in response to the sign-up or provisioning request;

use the tenant private key to generate a certificate signing request (CSR) for the web domain, the CSR comprising a domain name system (DNS) name for the web domain; and transmit the CSR to a certificate authority (CA) selected by the tenant.

17. The apparatus of claim 16, wherein the one or more processors are individually or collectively further operable to execute the code to cause the apparatus to:

receive the certificate from the CA in accordance with the CSR; and store the certificate in association with the encrypted tenant private key.

18. The apparatus of claim 15, wherein the API call is configured to cause the key protection component to:

generate the secret key using the key agreement public key provided in the API call and the private key provisioned to the key protection component;

decrypt the tenant private key using the secret key;

generate the signature using the tenant private key; and include the signature in the API response.

19. The apparatus of claim 15, wherein the one or more processors are individually or collectively further operable to execute the code to cause the apparatus to:

establish a secure connection with the client device that requested access to the web domain of the tenant based at least in part on performing a successful transport layer security (TLS) handshake procedure; and exchange data with the client device via the secure connection, wherein TLS encryption of the data is performed by the server host.

20. A non-transitory computer-readable medium storing code for data processing, the code comprising instructions executable by one or more processors to:

receive, at a server host, a request to access a web domain associated with a tenant of a multi-tenant cloud platform;

retrieve, from a database associated with the multi-tenant cloud platform, a tenant private key associated with the tenant and a certificate comprising a tenant public key associated with the tenant, wherein the tenant private key is encrypted with a secret key derived from a key agreement public key associated with the tenant and a private key provisioned to a key protection component of the server host;

transmit, to the key protection component, an application programming interface (API) call comprising the encrypted tenant private key and the key agreement public key retrieved from the database;

receive, from the key protection component, an API response comprising a signature associated with the tenant private key; and provide, to a client device associated with the request to access the web domain of the tenant, the certificate retrieved from the database and the signature from the API response, wherein the certificate is used to verify the signature.

* * * * *